United States Patent [19]
Inatome et al.

[11] Patent Number: 5,886,772
[45] Date of Patent: Mar. 23, 1999

[54] FILM PROCESSING APPARATUS

[75] Inventors: Kiyoshi Inatome; Etsuro Saito; Takeshi Shimodaira, all of Kanagawa, Japan

[73] Assignee: Sony Corporation, Tokyo, Japan

[21] Appl. No.: 799,167

[22] Filed: Feb. 14, 1997

[30] Foreign Application Priority Data

Feb. 17, 1996 [JP] Japan .................................. 8-054203
Feb. 17, 1996 [JP] Japan .................................. 8-054208

[51] Int. Cl.⁶ ...................................................... G03B 1/48
[52] U.S. Cl. ............................................. 352/225; 352/92
[58] Field of Search ............................. 352/92, 120, 225

[56] References Cited

U.S. PATENT DOCUMENTS

| | | | |
|---|---|---|---|
| 1,692,092 | 11/1928 | Oehmichen | 352/225 |
| 2,868,066 | 1/1959 | Argyle | 352/120 |
| 3,137,221 | 6/1964 | Watts | 352/225 |
| 3,479,114 | 11/1969 | Heinonen, Jr. | 352/225 |
| 3,544,207 | 12/1970 | John, Jr. | 352/92 |
| 3,612,674 | 10/1971 | Sasaki | 352/225 |
| 3,622,235 | 11/1971 | Yamada | 352/92 |
| 3,753,612 | 8/1973 | Okey et al. | 352/92 |
| 4,744,651 | 5/1988 | Beauviala | 352/225 |
| 4,950,071 | 8/1990 | Maron | 352/225 |
| 5,710,616 | 1/1998 | Saito et al. | 352/92 |

*Primary Examiner*—Russell Adams
*Attorney, Agent, or Firm*—Frommer Lawrence & Haug, LLP; William S. Frommer; Dennis M. Smid

[57] ABSTRACT

An apparatus for intermittently feeding a movie film on a frame by frame basis to a film processing unit for processing thereat by inserting projections into openings formed on both sides of the movie film at predetermined pitches and driving the same by use of a driving device. The film processing apparatus may include a guiding device for guiding the film along a path which passes nearby the film processing unit so as to enable the film processing unit to capture an image from the film and to perform processing of the same. The film processing apparatus may further include a device for exerting pressure on the film by moving the guiding device so that a portion of the film which passes nearby the film processing unit is held in tension, and a restraining device for restraining the guiding means from moving.

26 Claims, 23 Drawing Sheets

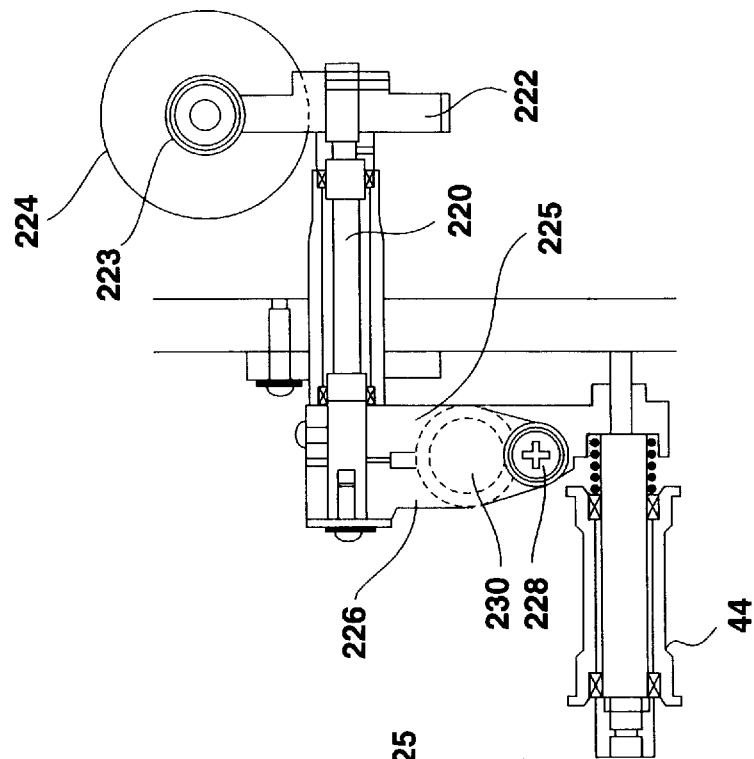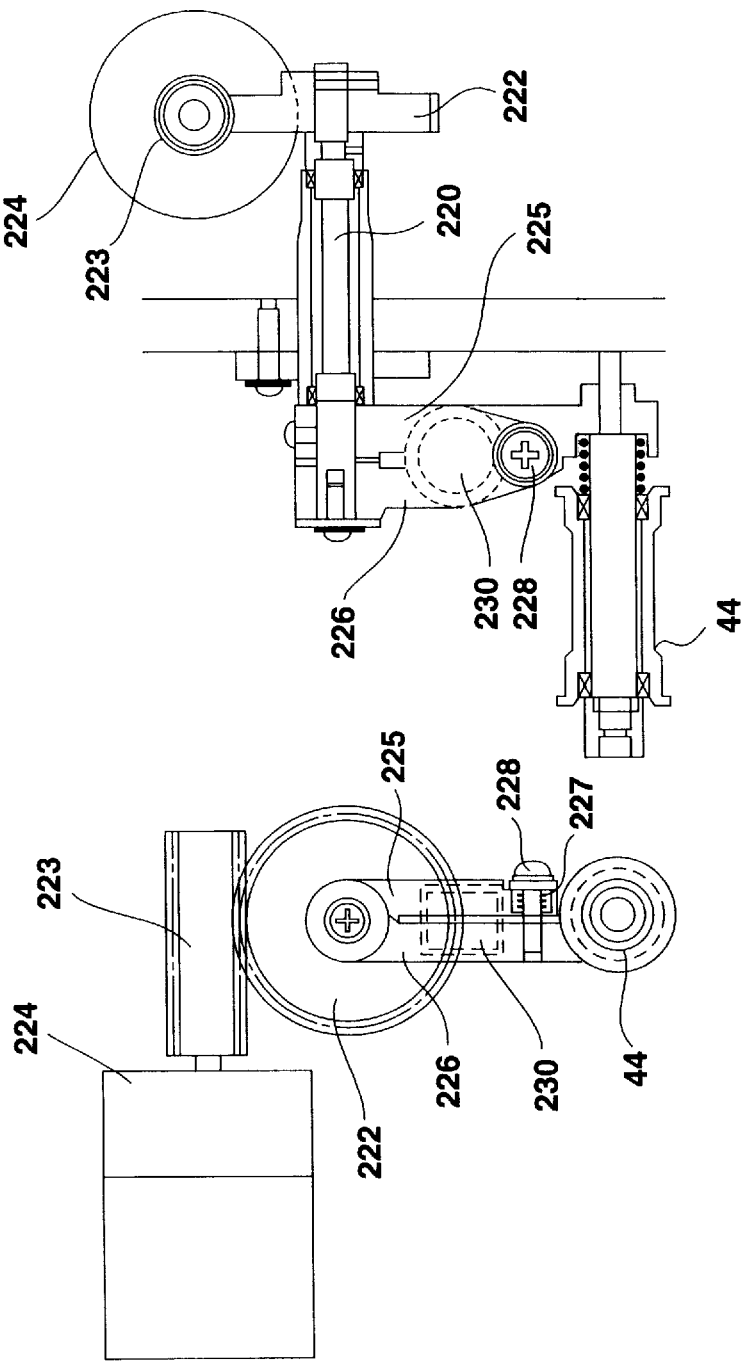

FIG. 7
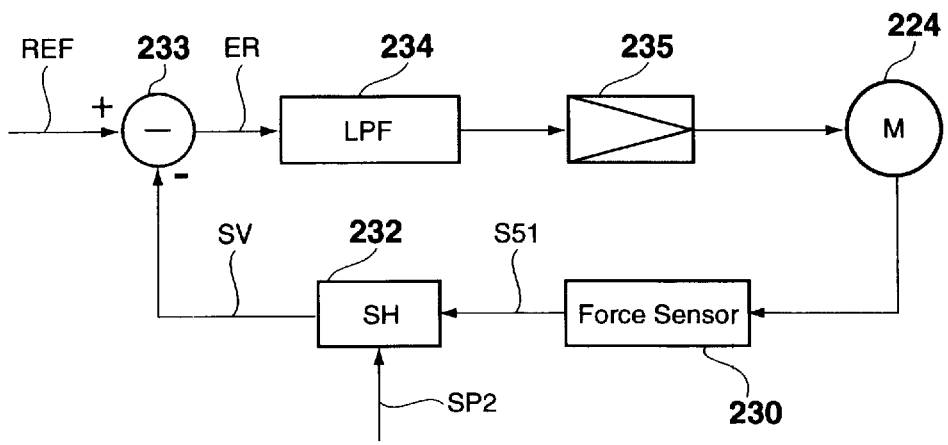
FIG. 8A
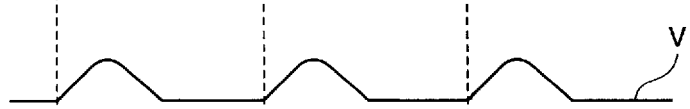
FIG. 8B
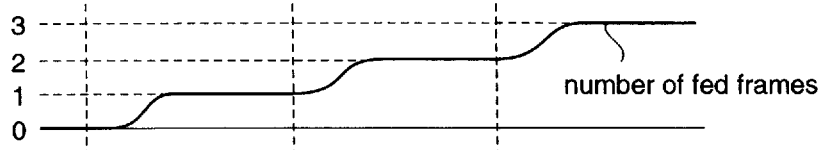
FIG. 8C
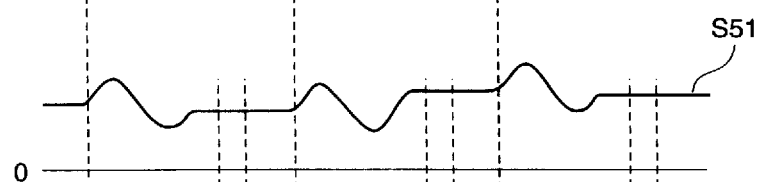
FIG. 8D
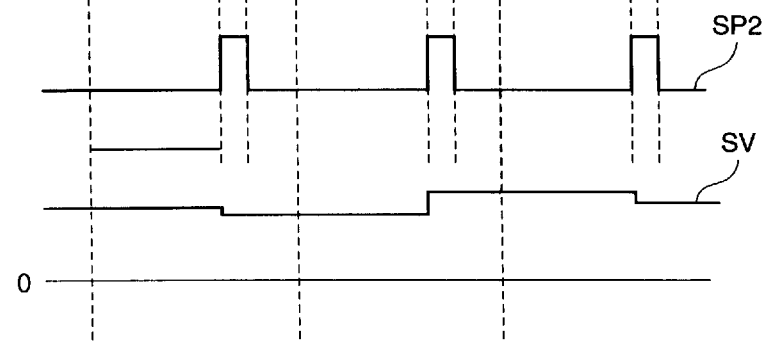
FIG. 8E
FIG. 8F

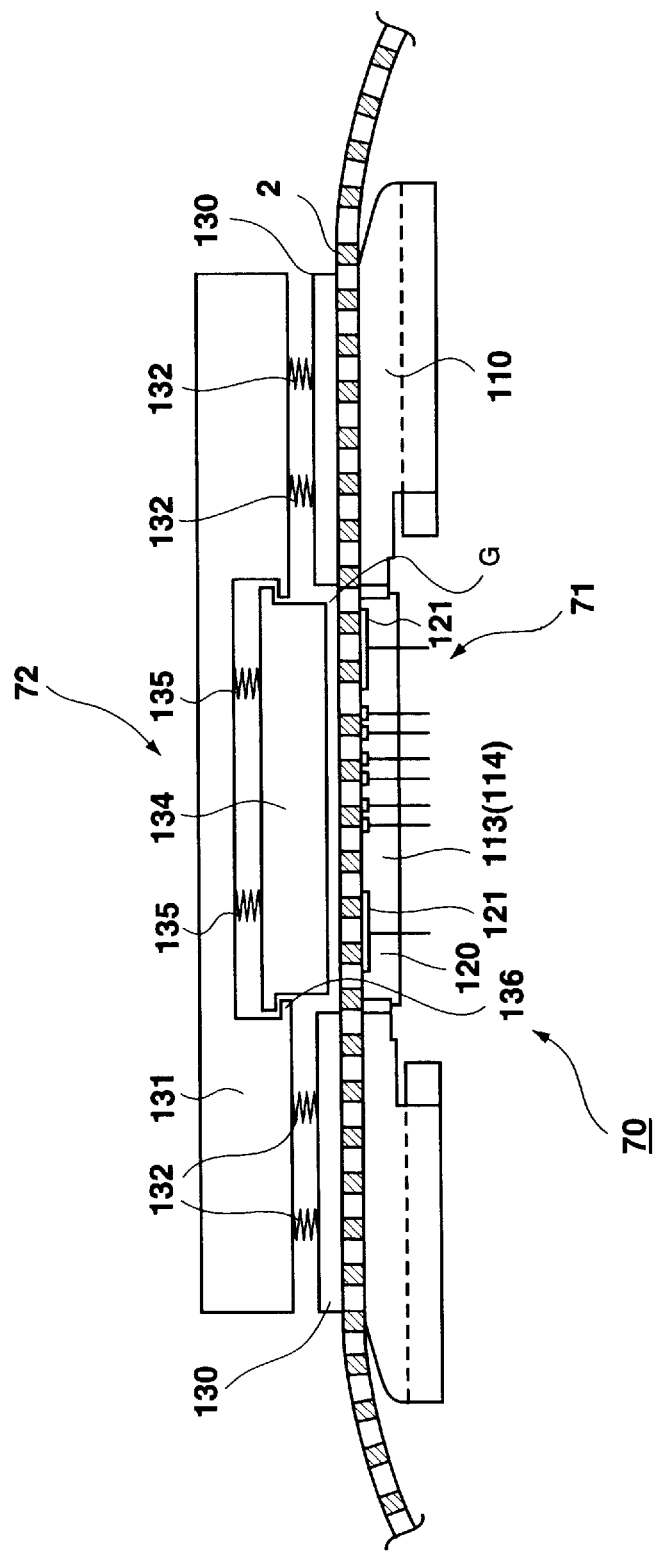

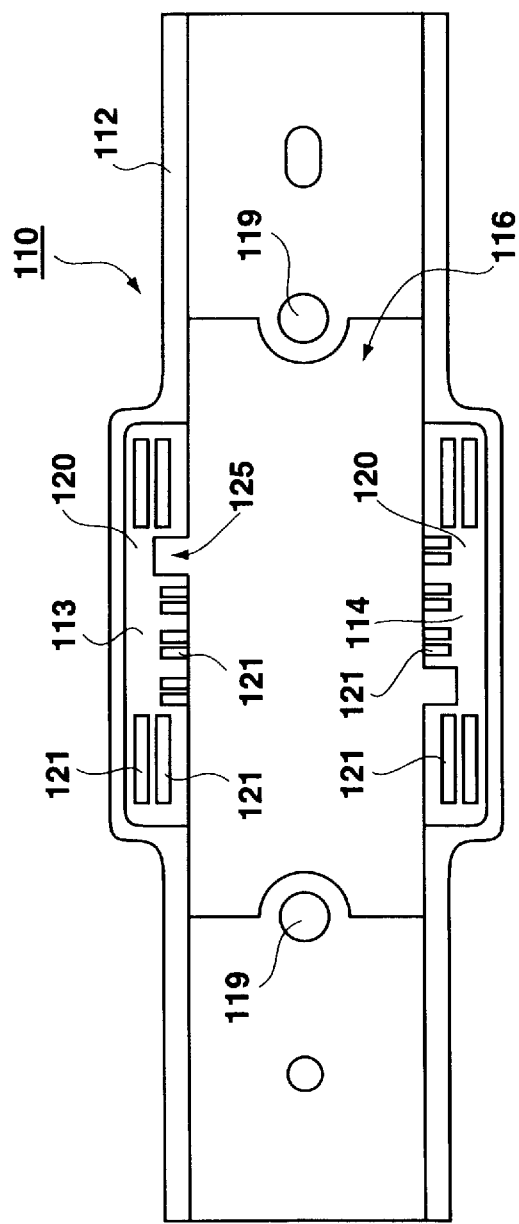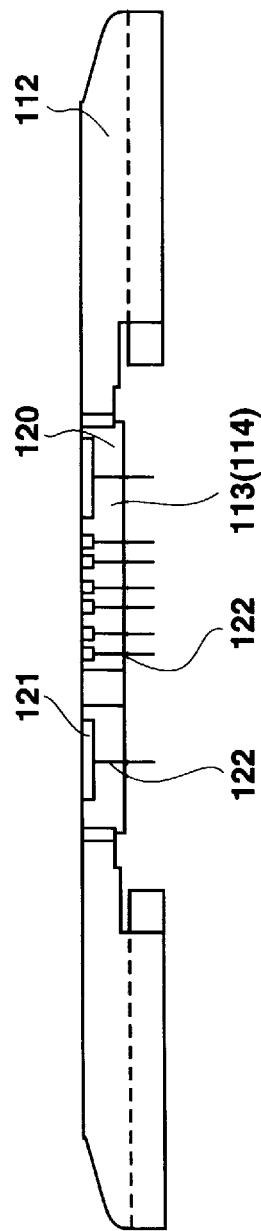
FIG. 11A
FIG. 11B

FILM PROCESSING APPARATUS

BACKGROUND OF THE INVENTION

The present invention relates to a film processing apparatus, which may be utilized with a telecine apparatus for generating television signals from a movie film, a movie projector, and so forth, and, more particularly, to such apparatus which detects positioning errors of a running movie film and corrects the position of the film in accordance therewith, and provides a film path such that the film is protected from damage and enables high quality film processing.

Film processing apparatus may utilize a film feeding system (such as a continuous film feeding system and an intermittent film feeding system) depending on the type of apparatus. For example, a telecine apparatus generally uses a continuous film feeding system, and movie projectors which project pictures of a lighted movie film directly on a screen frame by frame use an intermittent film feeding system.

The continuous film feeding system uses a capstan for feeding a movie film at a constant rate. A telecine apparatus using such system lights the movie film with a light in a repeating one-dimensional vertical scanning arrangement in the film feeding direction. Consequently, the movie film is picked up frame by frame in such cluster scanning order and supplied to light receiving elements so as to generate television signals from the movie film.

On the other hand, the intermittent film feeding system uses rectangular openings called perforations formed on both sides of the film for feeding the movie film frame by frame intermittently. For movie projectors using this system, a cam mechanism may be used to insert pins called registration pins into the perforations of the film and to drive the same so as to feed the film intermittently. Furthermore, synchronized with this intermittent feeding of the film, a light is projected intermittently on the film from a light source and the transmitted light from the film is projected on a screen.

The continuous film feeding system has an advantage in that a relatively small load is applied to the film because there is no repetition of feeding and stopping the film. However, it has a disadvantage in that the lighting may not be properly synchronized with the feeding of the film. Thus, the continuous film feeding system may cause jitters in the longitudinal direction of the film and flickering which may result in shifting or distortion of pictures. Furthermore, for a telecine apparatus using a so-called flying spot scanner for scanning pictures by projecting a spot-like light on the film, the accuracy may vary and the life may be shortened depending on the operation hours, temperatures, and other conditions of the apparatus. As a result, troublesome and costly periodical maintenance and inspection are needed for such apparatus.

An intermittent film feeding system may simplify the configuration of the optical system and the film feeding system, but may require laborious adjustment to correct the positioning of the registration pins so as to engage the perforations of the film. Unless registration pins are positioned correctly, the film may be damaged by the registration pins. Further, such apparatus may produce large and bothersome mechanical sounds.

The above intermittent film feeding system also has a problem in that pictures projected on a screen may vibrate and shift each time a frame is fed, or may gradually go up/down from an initial position (hereafter, displacement of a picture caused as a result of processing in the apparatus is referred to as picture shift). Such problem may not be prevented completely. As is to be appreciated, picture shift deteriorates the quality of pictures projected on a screen by a movie projector, which is typically unacceptable to an audience.

In a telecine apparatus, this picture shift is converted to video signals which cause still pictures to seem as if they are vibrating which, in turn, may causing the frequency to become high when such video signals are compressed and causing an unnecessary increase in the amount of data. Furthermore, when digitizing pictures, the desired effect cannot be obtained if the object to be edited, which is expected to be at a certain same position, vibrates.

Therefore, in a film processing apparatus, it is desirable that the film guided by a guiding unit is positioned correctly. A position detector has been proposed for detecting whether or not the object film is positioned correctly. In the position detector, a plurality of electrodes are provided at the edge of the film and a conductor facing these electrodes is provided across the film. A condenser is formed with these electrodes and the conductor may be used as polar plates spaced with the film thickness. The capacitance of the condenser, which varies according to change in the film position, is used for detecting the film position on the basis of the amount of the capacitance variation.

However, a movie film often expands and contracts depending on environmental conditions like temperature, humidity, and so forth. These conditions may cause the positioning accuracy to be lowered.

Furthermore, perforations are apt to deform as the film is used for a long time. Additionally, foreign objects may also stick on the film surface. Even if a plurality of electrodes are arranged so that perforations cross between these electrodes to detect film positioning errors according to the capacitance formed between these electrodes, the above deformation and stuck foreign objects of the film may locally change the thickness of the film which may cause the film positioning accuracy to be significantly lowered.

A movie film has a dielectric constant and a thickness which may be dependent upon the film material and, as such, may be different from that of other films. Since the relation between film positioning error and capacitance changes due to such film characteristics, correct positioning error detection may not be obtained.

OBJECTS AND SUMMARY OF THE INVENTION

It is an object of the present invention to provide a film processing apparatus having a simplified configuration which facilitates the performing of maintenance and inspection, and which protects the film from damages and enables high quality processing of images obtained from the film.

Another object of the present invention is to provide a film processing apparatus that can detect film positioning errors correctly even when the material quality, thickness, and other properties of the film are changed while effectively avoiding adverse influences due to film expansion and contraction.

In accordance with an aspect of the present invention, a film processing apparatus for intermittently feeding a movie film on a frame by frame basis to a film processing unit for processing thereat by inserting projections into openings formed on both sides of the movie film at predetermined pitches and driving the same by use of a driving device is provided. The film processing apparatus comprises a guiding device for guiding the film along a path which passes nearby the film processing unit so as to enable the film processing unit to perform the processing, a device for exerting pressure on the film by moving the guiding device so that a portion of the film which passes nearby the film processing unit is held in tension, and a restraining device for restraining the guiding device from moving.

The restraining device may include a magnetic brake or a damper. The guide device may include a pressure detector, such as a load cell for detecting pressure exerted on the film. The exerting device may move the guiding device according to the detection result of the pressure detector. However, the guide may be held in place by the restraining device while the film is running and may be moved when the film stops.

The path of the film includes two loosened or non-tension portions in which the film is substantially not in tension and a portion between the non-tensioned portions in which the film passes through or nearby the film processing unit under tension. The path may also include a loop portion in which the film processing unit is located at an intermediate point thereof, so that the path is formed symmetrically with the film processing unit being approximately disposed on the center of symmetry. The guiding device contacts a base side of the film while guiding the film in the loop portion.

The driver circuit includes a motor-driven sprocket whose teeth are formed smaller than the openings in the film.

The present apparatus may further include a position detector for detecting the position of the film and outputting a detection signal. The position detector may include a first electrode and a second electrode which are arranged to face each other across the film and whose capacitance level changes in accordance with position changes of the film. The first electrode includes a pair of electrodes having approximately the same shape and arranged near positions where the openings stop when the film is fed intermittently frame by frame. A plurality of pairs of electrodes may be symmetrically disposed at corresponding positions corresponding on both sides of the film with respect to a feeding direction of the film, in which the number of the pairs of electrodes is the same.

The first electrode is arranged on a first base and the second electrode is arranged on a second base. The second base may include a mechanism for pressing the film against the first base and being movable in a direction corresponding to the thickness of the film. The second electrode is arranged so as to have a uniform gap between the film and to be movable in the thickness direction of the film. The first base may have a cutout at a position corresponding to one of the openings of the film.

The present apparatus may further comprise a signal correcting circuit for correcting the signal level of the detection signal while the film is stopped by use of a reference signal level obtained from the amplitude of the detection signal produced while the film is running. The correction of the signal level of the detection signal while the film is stopped can also be performed by reference to the signal level of the detection signal obtained while the film is running. The reference signal level can be determined from an averaged value of a plurality of positive and negative peak values of the detection signal while the film is running.

The present apparatus may further comprise a position error signal detecting circuit for detecting or determining a position error signal from the detection signal which indicates a displacement of the film from a specified reference position when the film is stopped in or nearby the film processing unit. When detecting the positioning error signal, the positioning error signal detecting circuit obtains a timing signal from the detection signal which indicates that the film has stopped.

The present apparatus may further comprise a feeding length correcting circuit for correcting the feeding length of the film according to the positioning error signal.

The present apparatus may further comprise a light source for lighting the film in the film processing unit, a light receiving plane for receiving a light transmitted through the film processing unit after lighting the film, and an optical axis correcting mechanism for correcting an optical axis of the light receiving plane according to the positioning error signal.

Other objects, features and advantages according to the present invention will become apparent from the following detailed description of an illustrated embodiment when read in connection with the accompanying drawings in which corresponding components are identified by the same reference numerals.

BRIEF DESCRIPTION OF THE DRAWINGS

FIG. 6A and FIG. 6B illustrate a guide roller holding mechanism in accordance with another embodiment of the present invention;

FIG. 7 is a diagram of a driving system;

FIG. 8A through FIG. 8F are signal waveforms to which reference will be made in explaining the operation of the driving system of FIG. 7;

FIG. 10 is a diagram of a gate unit in a film positioning error detecting mechanism;

FIG. 11A and FIG. 11B illustrate a guide shoe in the gate unit of FIG. 10;

DESCRIPTION OF THE PREFERRED EMBODIMENTS

Figure 1:
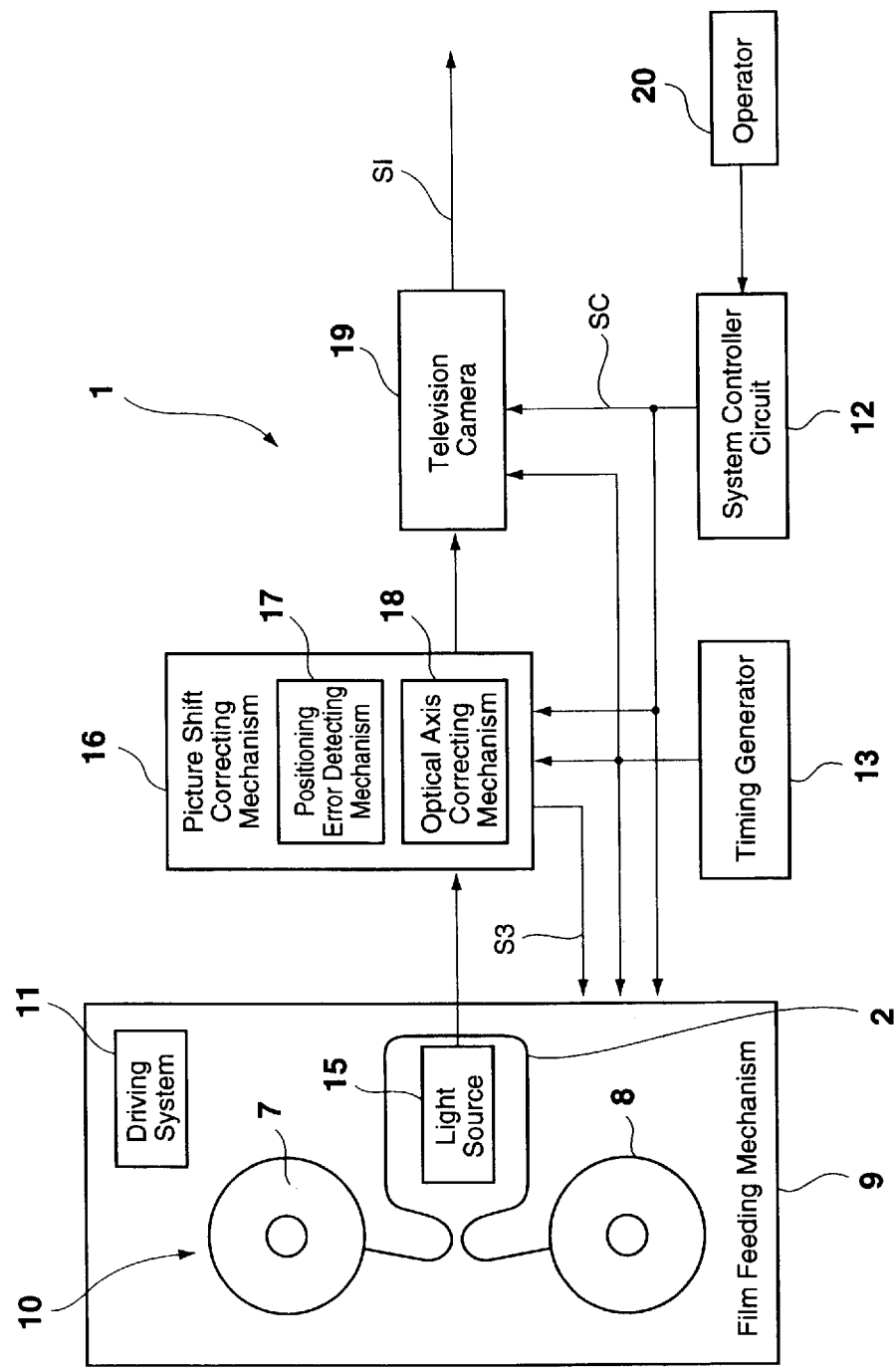
FIG. 1 is a diagram of a telecine apparatus according to an embodiment of the present invention.

FIG. 1 is a diagram of a telecine apparatus in accordance with an embodiment of the present invention. Such telecine apparatus 1 is adapted to pick up images from, for example, a 35 mm movie film 2, on a frame by frame basis and to generate video signals S1 therefrom.

Figure 2:
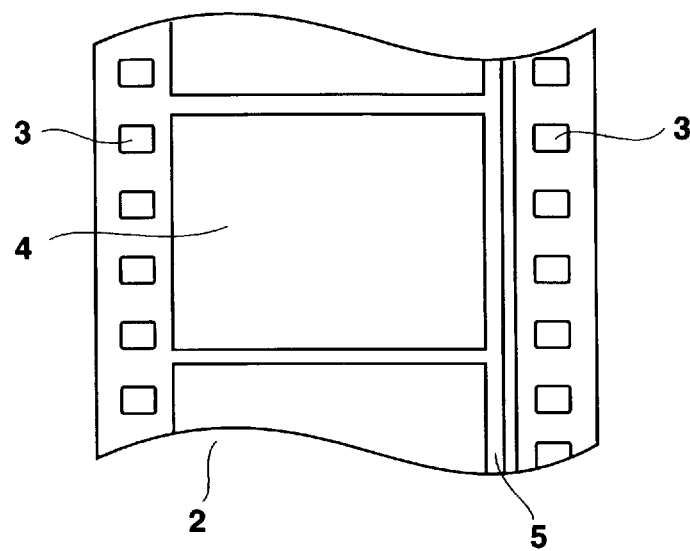
FIG. 2 is a view of a movie film.

As shown in FIG. 2, a movie film 2 includes perforations 3 arranged at specified pitches along the edges and frames 4 arranged in the center of the movie film on which images are recorded sequentially in reference to the perforations 3. For a 35 mm movie film 2, each frame is provided with four perforations 3. A sound track 5 is provided between frames 4 and perforations 3 on one side on which sound signals are recorded.

The movie film 2 may be constructed of a polyester base on which photosensitive emulsion is laminated. In the telecine apparatus 1 of FIG. 1, the film 2 is wound on a feed reel 7 or a take-up reel 8 so that the emulsion laminated side faces outside a loop formed by the film itself.

In the telecine apparatus 1 shown in FIG. 1, a film feeding mechanism 9 includes a film feeding system 10 and a driving system 11 used for driving a motor, and so forth of the film feeding system 10. The film feeding mechanism 9 may switch operations according to a control signal SC output from a system controller circuit 12 so as to feed the movie film 2 intermittently from the feed reel 7 to the take-up reel 8 or from the take-up reel 8 to the feed reel 7 while the film 2 is held or maintained so as to have a loop shape by the film feeding system 10. The film 2 may be fed forward or rewound rapidly as desired between the feed reel 7 and the take-up reel 8. While the film 2 is fed forward intermittently, the film feeding mechanism 9 controls the operation of the film feeding system 10 according to a timing signal supplied from a timing generator 13. As a result, the 35 mm movie film 2 can be fed intermittently at a specified or desired speed of, for example, 24 frames per second.

A light source 15 may include a lamp unit and a rotary shutter unit. The light source 15 is controlled by the timing signal supplied from the timing generator 13 so as to be operated in synchronism with the intermittent film feeding of the film feeding mechanism 9 to intermittently light the movie film 2.

A picture shift correcting mechanism 16 may include a positioning error detecting mechanism 17 and an optical axis correcting mechanism 18. The light emitted from the light source 15 passes through the film 2 and is captured by a television camera 19 by any of the optical axis correcting mechanism 18. At this time, the positioning error detecting mechanism 17 checks each frame of the film 2 at the stop position for a positioning error and the picture shift correcting mechanism 16 instructs the optical axis correcting mechanism 18 to change the optical path of the light transmitted from the film 2 according to the positioning check result so as to correct a picture shift. Furthermore, the picture shift correcting mechanism 16 may output a positioning error detection signal S3 if an error is detected in the direction of film feeding so as to correct the intermittent feeding length of the film 2 in the film feeding mechanism 9.

By receiving the light transmitted of the movie film 2 by way of the picture shift correcting mechanism 16, the television camera 19 picks up images of each frame of the movie film 2 lighted by the light source 15. At this time, the television camera 19 may be controlled by the timing signal output from the timing generator 13. The television camera 19, in synchronism with the intermittent feeding of the film 2, outputs image signals which correspond to the frames of the film 2 as video signals S1.

The timing generator 13 generates and outputs various timing signals utilized in the operation of the telecine apparatus 1. The system controller circuit 12 outputs control signals SC to each appropriate device in response to an input of an operator 20. In accordance with the control signals SC, the film 2 may be rapidly fed forward or rewound, or fed intermittently and video signals S1 may be supplied from the television camera 19.

Figure 3:
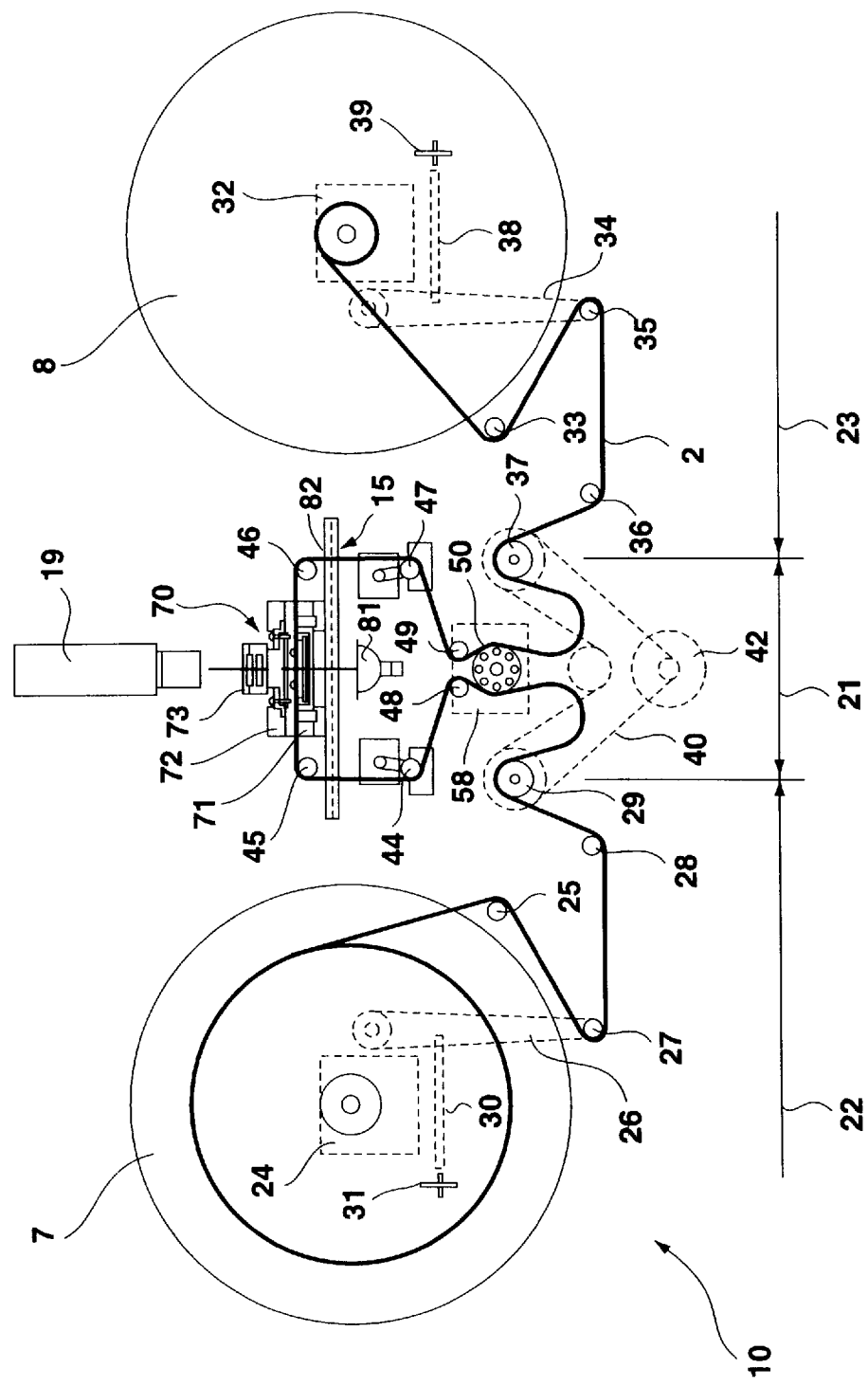
FIG. 3 is a view of a film feeding system used in the telecine apparatus of FIG. 1.

FIG. 3 illustrates the film feeding system 10 provided in the film feeding mechanism 9. This film feeding system 10 may include an intermittent film feeding section 21 for intermittently feeding the movie film 2; a supply side continuous film feeding section 22 for feeding the movie film 2 at a uniform rate to the intermittent film feeding section 21 from the feed reel 7; and a take-up side continuous film feeding section 23 for taking-up the film 2 at a uniform rate from the intermittent film feeding section 21.

The supply side continuous film feeding section 22 holds the feed reel 7 at a rotary shaft of a reel motor 24. In the supply side film feeding section 22, the movie film 2 is pulled out from the feed reel 7, engaged with a guide roller 25, turned back gently by a guide roller 27 held by a tension arm 26, and led to a supply side film feeding sprocket 29 by way of a guide roller 28. The tension arm 26 is pulled by a spring 30 so as to position the guide roller 27 apart from the supply side film feeding sprocket 29. The tension of this spring 30 may be detected by a sensor 31. An output signal from this sensor 31 is monitored by a driving system 11 (FIG. 1) so that if such tension is reduced so that the movie film 2 is loosened, feeding of the film 2 can be stopped.

The take-up side continuous film feeding section 23 is arranged symmetrically with respect to the supply side continuous film feeding section 22 with a gate unit 70 being the center of symmetry. In other words, the take-up side continuous film feeding section 23 holds a take-up reel 8 on a rotary shaft of a reel motor 32 and leads the movie film 2 onto this take-up reel by way of a guide roller 33. In the take-up side continuous film feeding section 23, the film 2 is turned gently by a guide roller 35 which is held by a tension arm 34, and led to a feeding sprocket 37 by way of a guide roller 36. The tension arm 34 is pulled by a spring 38 so as to position the guide roller 35 apart from the take-up side film feeding sprocket 37. The tension of the spring 38 can be detected by a sensor 39.

In the film feeding system 10, the driving system 11 monitors the signals output from the sensor 39. Just as in supply side, if the film 2 is loosened, feeding of the film 2 can be stopped. Furthermore, since the supply side continuous film feeding section 22 and the take-up side continuous film feeding section 23 are arranged symmetrically on both sides of the gate unit 70, the film 2 can be fed in any of forward and backward directions under the same conditions.

Both supply side film feeding sprocket 29 and take-up side film feeding sprocket 37 are synchronously rotated by a timing belt 40 driven by a continuous film feeding motor 42. Thus the film feeding system 10 drives the motor 42 together with a take-up side reel motor 32 to rotate so as to rewind the film 2 rapidly onto the take-up reel 8 from the supply reel 7 while the intermittent film feeding section 21 is controlled to be freed from intermittent film feeding operation. On the other hand, both supply reel motor 24 and continuous film feeding motor 42 may be rotated so as to rewind the film 2 rapidly onto the supply reel 7 from the take-up reel 8 while the intermittent film feeding section 21 is controlled to be freed from intermittent feeding operation.

When picking up pictures of the film 2 and outputting resulting video signals S1, the reel motor 24 or 32 can be rotated in correspondence with the speed and direction of the intermittent film feeding in the intermittent film feeder 21, and the rotating direction and speed of the continuous film feeding motor 42 can be set to feed the film 2 to the intermittent film feeding section 21 at a uniform rate and the film 2 led out from the intermittent film feeding section 21 can be wound onto the take-up reel 8 or supply reel 7 at a uniform rate.

The supply side film feeding sprocket 29 and the take-up side film feeding sprocket 37 feed the film 2 in such a way as to engage their teeth with the perforations 3 (FIG. 2) for feeding the film 2. The shape or size of the teeth is smaller than that of the perforations 3. Consequently, both supply side sprocket 29 and the take-up side sprocket 37 may avoid damaging of the film 2 even when the film 2 expands and contracts. In the film feeding system 10, the supply side sprocket 29 and the take-up side sprocket 37 provided with the small teeth may apply tension to the film 2 via the tension arms 26 and 34, so that the film 2 can be properly fed at the specified rate.

The intermittent film feeding section 21 holds and intermittently feeds the loop-like movie film 2. To perform such functions, the intermittent film feeding section 21 includes 4 guide rollers 44 to 47 arranged almost symmetrically on both sides of a virtual reference line vertical to the line between the rotation centers of both the supply side sprocket 29 and the take-up side sprocket 37. The four guide rollers 44 to 47 are arranged almost on top of a rectangle formed by these guide rollers so that they come in contact with the guide rollers with the base of the movie film 2 so as to effectively protect the emulsion of the film 2 from damage.

The intermittent film feeding section 21 further includes two guide rollers 48 and 49 arranged symmetrically with respect to the above-mentioned virtual reference line under the guide rollers 44 to 47 as shown in FIG. 3. The two guide rollers 48 and 49 may be used to bring feed and taken-out portions of the film 2 guided by the four guide rollers 44 to 47 close to each other so as to engage them with an intermittent film feeding sprocket 50. As such, the guide rollers 44 to 47 form an intermittent film feeding guide unit for holding the film 2 in a loop-like shape in which the base side of the film 2 is in contact with the guide rollers.

The intermittent film feeding section 21 intermittently feeds the film 2 which is brought closely together by the two guide rollers 48 and 49 and engaged by the intermittent film feeding sprocket 50. As shown by an enlarged view in FIG. 4, the intermittent film feeding sprocket 50 may include sprocket shoes 51 to 56 arranged and pressed down on both supply side and take-up side at the bottom of a loop-like shape portion of the film 2 so as to prevent the film 2 from disengaging from the teeth of the sprocket. The intermittent film feeding sprocket 50 may be connected directly to and held by a rotary shaft of a stepping motor 58. As a result, the sprocket 50 may feed a specified length of the loop-like film 2 from the supply side to the take-up side or from the take-up side to the supply side according to a number of drive pulses and polarity of the drive pulse(s) supplied to the stepping motor 58.

The sprocket teeth formed at the periphery of the sprocket may engage the perforations 3 (FIG. 2) so as to feed the film 2. The teeth of the sprocket 50 are smaller than the perforations 3, so that the perforations 3 are not damaged while the film 2 is fed.

In this embodiment, the driving system 11 applies driving pulses to the stepping motor 58 intermittently, so that the film 2 can be fed intermittently. When feeding or rewinding the film 2 rapidly, the motor 58 is held in a so-called free state so that it can rotate freely. Therefore, in this embodiment, the intermittent film feeding sprocket 50, the sprocket shoes 51 to 56, and the stepping motor 58 work together to form a film feeder feeding the film intermittently in the intermittent film feeding guide unit.

Figure 4:
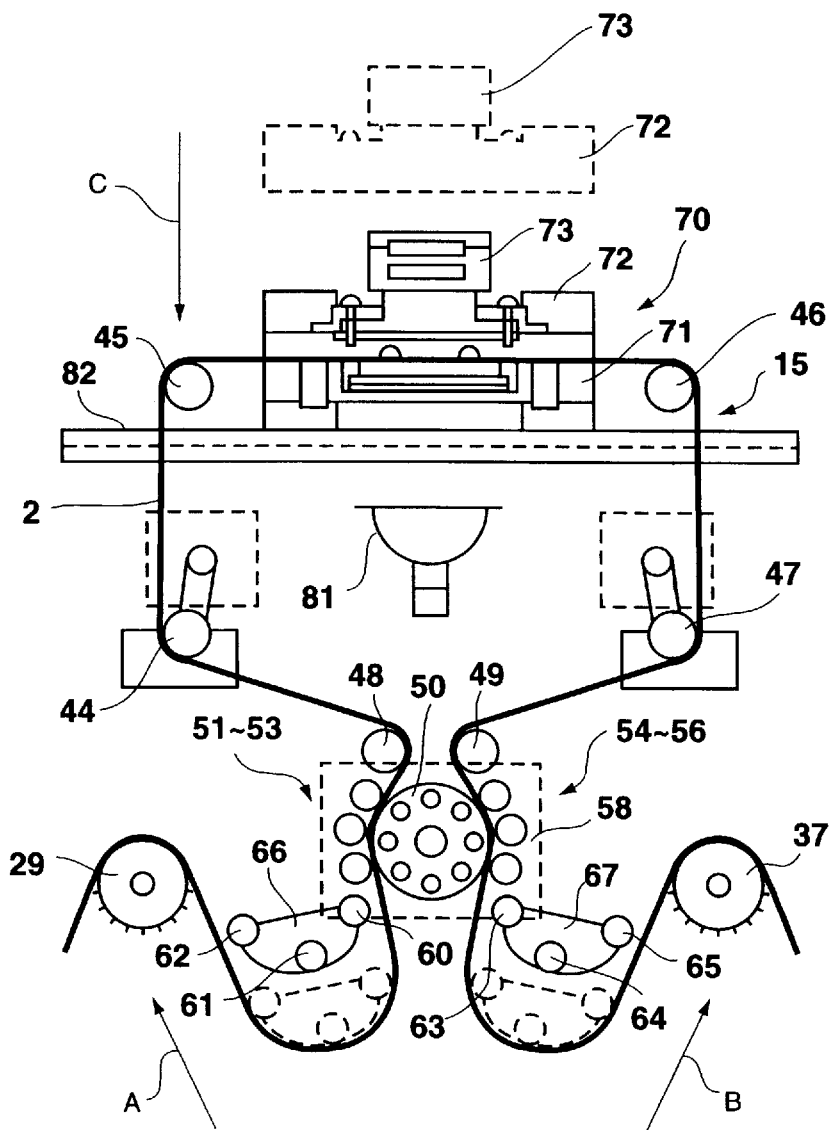
FIG. 4 is an enlarged view of an intermittent film feeder used in the film feeding system of FIG. 3.

With reference to FIGS. 3 and 4, the intermittent film feeding section 21 is further formed so that the film 2 can be held loosely between the intermittent film feeding sprocket 50 and the supply side film feeding sprocket 29. Thus, a shock absorbing section is formed between the supply side continuous film feeding section 22 and the intermittent film feeding section 21. In the same way, the film 2 is held loosely between the intermittent film feeding sprocket 50 and the take-up side film feeding sprocket 37 to form a shock absorbing section between the take-up side continuous film feeding section 23 and the intermittent film feeding section 21. Thus, the tension of the loop-like film 2 may be controlled by each of the supply side continuous film feeding section 22 and the take-up side continuous film feeding section 23 independently.

The above-described shock absorbing sections may be formed by loading the film 2 in the film feeding system 10 while movable members 66 and 67, each holding three guide rollers 60 to 62 or 63 to 65, are disposed in the specified positions shown with a broken line in FIG. 4 before the movable members 66 and 67 are withdrawn from the passage of the film 2 in the directions indicated by arrows A and B. Such shock absorbing sections may enable the film feeding system 10 to protect operations of the supply side continuous film feeding section 22 and the take-up side continuous film feeding section 23 from being adversely affected by abrupt changes of film tension during intermittent film feeding, as well as to effectively protect the film 2 from being damaged by the guide roller 28 and so forth so that the film 2 may be properly fed.

In the formed film feeding passage, the gate unit 70 is arranged between the guide rollers 45 and 46. The gate unit 70 may include a fixed picture gate 71 fixed to the base of the telecine apparatus and a movable picture gate 72 which is arranged to face the fixed picture gate 71 across the film 2.

The movable picture gate 72 is adapted to press the film 2 against the picture gate 71 with a predetermined pressure and to move upward together with an optical system 73 of the optical axis correcting mechanism 18 (shown in FIG. 1 and hereinafter more fully described) provided in the picture shift correcting mechanism 16 by use of a handle (not shown). As such, in the film feeding system 10, after the film 2 is set on the picture gate 71, the movable picture gate 72 is moved down in the direction shown by an arrow C by use of the handle so that the film 2 can be loaded in the gate unit 70.

Furthermore, each of the fixed and movable picture gates 71 and 72 has an opening through which light may be projected to the film 2, so that pictures of the film may be picked up by the television camera 19 (FIG. 1) while the film 2 is loaded. The supply side and the take-up side of the intermittent film feeding section 21 including the gate unit 70 may be arranged symmetrically with the opening of the gate unit 70 being the center of symmetry. Thus, the film 2 can be fed under the same conditions regardless of the feeding direction. Such arrangement may be beneficial during editing or processing operations, that is, when processing a film, specific frames of the film may be searched. During this time, the film feeding direction may be changed frequently. Other apparatus having guide rollers may arrange such rollers so as to guide the film properly from supply side to take-up side, but may not be useful when feeding the film from take-up side to supply side. As is to be appreciated, by arranging the guide members on both supply and take-up sides symmetrically around the opening of the gate unit 70, the present apparatus enables the film to run in both directions under the same conditions, thereby assuring smooth feeding of the film without film damages.

The light source 15 is positioned inside the loop-like film 2 under the fixed picture gate 71. The light source 15 emits a light from a lamp 81 to the opening of the gate unit 70. A disc-like rotary shutter 82 having openings arranged at specified pitches is arranged between the lamp 81 and the gate unit 70. In the light source 15, the rotary shutter 82 may be driven to rotate according to a timing signal from the timing generator 13 (FIG. 1). As a result, the light source 15 can light the film 2 held in the gate unit 70 intermittently in synchronism with the intermittent film feeding of the film feeding system 10.

Since the light source 15 is arranged inside the loop-like film 2 and the film is loaded so that its base side comes in contact with the guide rollers 44 to 47, the picture frames of the film are picked up from the emulsion side in the telecine apparatus 1. Such arrangement may produce higher quality video signals S1 as compared to an arrangement wherein the image is picked-up on the base side of the film. Furthermore, by arranging the light source 15 inside the loop-like film path as in the present apparatus, the image pick-up device can be disposed outside of the loop, thereby eliminating the limitation that the image picking up device must be smaller than the loop and allowing more space in which to arrange a larger television camera 19.

As described above, the television camera 19 in this embodiment may be part of an optical processing means for picking up pictures of the film 2.

Figure 5:
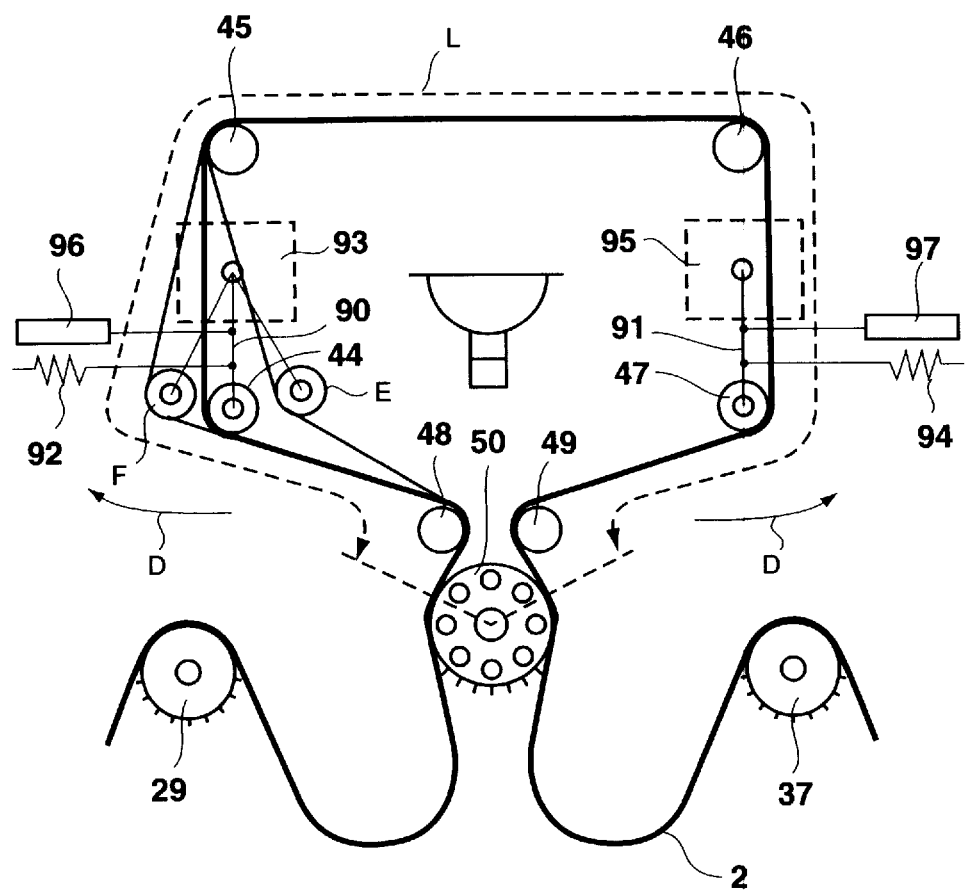
FIG. 5 is a view of the intermittent film feeder used in the film feeding system in FIG. 3.

FIG. 5 shows an enlarged view of the movie film 2 being held in a loop-like path in the film feeding system 10. Of the four guide rollers 44 to 47 forming this loop-like path, the two guide rollers 44 and 47 located closer to the intermittent film feeding sprocket 50 may be switched or moved as needed during an operation so that the intermittent film feeding can be performed correctly under the same conditions regardless of the feeding direction. In other words, each of the guide rollers 44 and 47 are respectively rotatably held at one end of control arms 90 and 91. These control arms 90 and 91 are rotatably fixed to the chassis of the telecine apparatus 1 with the rotary shafts at the ends opposite to the guide rollers 44 and 47 being fulcrums. The control arms 90 and 91 may be pulled by the springs 92 and 94 with a specified force in the direction shown with by arrows D to enlarge the loop of the film 2. Furthermore, the control arms 90 and 91 may be provided with magnetic brakes 93 and 95 on their rotary shafts. When feeding the film 2 intermittently from the supply side to the take-up side in the film feeding system 10 shown in FIG. 1, the driving system 11 drives the magnetic brake 95 to stop the rotation of the control arm 91 on the take-up side so as to hold the guide roller 47 held by the control arm 91 at a fixed position. On the other hand, when feeding the film 2 intermittently from the take-up side to the supply side, the driving system 11 drives the magnetic brake 93 to stop the rotation of the control arm 90 on the supply side to hold the guide roller 44 held by the control arm 90 at a fixed position.

The control arms 90 and 91 are respectively connected to air dampers 96 and 97. These air dampers 96 and 97 are used to prevent the guide rollers 44 and 47 from changing their positions abruptly when the loop of the film 2 is made smaller.

Since the film distance fed by the sprocket 50 may be absorbed when the loop-like film path contracts, a film positioning error may occur. Thus, for example, when feeding the film 2 intermittently from the supply side to the take-up side in the film feeding system 10, the guide roller 44 is held at a fixed position by the magnetic brake 93 while the film 2 is running. Additionally, the loop-like path of the film 2 may be prevented from abrupt changes following abrupt changes in tension of the film 2 caused by film running.

When the film 2 stops, the film is pressed by the spring 92 with a fixed tension in the direction to enlarge the film loop.

Therefore, the film 2 pressed by the spring 92 can be fed intermittently and accurately by avoiding slack or backlash even when a sprocket 50 having teeth smaller than the perforations 3 is used for feeding the film 2 intermittently in the film feeding system 10. Furthermore, even when the film 2 expands and contracts due to a change in time, temperature change, humidity, and the like, movement of the guide roller 44 can absorb this expansion and contraction of the film 2 to assure accurate intermittent film feeding. Although in the above embodiment, the guide roller 44 is held at a fixed position, the magnetic brake 93 may also be released so as to press the movie film 2 with a specified force by measuring the pressure applied to the spring 20 even while the film 2 is running.

The above description also applies for feeding the film intermittently from take-up side to supply side.

In other words, the perforations 3 may be arranged at a standard pitch of 4.75 mm so if N is the number of perforations of the film in the loop starting from and returning to the intermittent film feeding sprocket 50, a standard length L of the film 2 (engagement length from the supply side of the intermittent film feeding sprocket 50 to its take-up side) in the loop starting from and returning to the intermittent film feeding sprocket 50 can be represented by 4.75×N (mm). As shown by E and F, the control arm 90 or 91 can be rotated according to the expansion or contraction of the film 2 to compensate for the expansion or contraction. Thus, film feeding system 10 can absorb the expansion and contraction of the film 2 so as to maintain the accuracy of the intermittent film feeding.

Thus, the springs 92 and 94 may be used to change the positions of the guide rollers 44 and 47 to form a means for pressing the film 2, while the air dampers 96 and 97 may be used to form a means for limiting abrupt positional changes of the guide rollers 44 and 47.

Although the above embodiment describes pressing the film using springs and dampers, the present invention also allows abrupt tension changes of the film caused by intermittent feeding to be avoided by changing the positions of the guide rollers according to the expansion and contraction of the film. That is, as shown in FIGS. 6A and 6B, the guide roller 44 may change its position around the rotary shaft 220. In other words, the rotary shaft 220 may be coupled to a gear 222 which, in turn, is engaged with a worm gear 223. The worm gear 223 can be rotated by a motor 224 fixed to an output shaft. Further, one end of a motor coupling arm 225 is fixed to the end of the rotary shaft 220 opposite to the gear, and one end of a force detecting arm 226 can also be attached to the rotary shaft so as to be freely rotatable.

The force detecting arm 226 holds the guide roller 44 at one end so as to be freely rotatable. The force detecting arm 226 may be pressed by a spring 227 so that the angle between the motor coupling arm 225 and the arm 226 is minimized and the motor coupling arm 225 is not separated from the arm 226 by more than a predetermined angle. Furthermore, the force detecting arm 226 is also provided with a force sensor 230, which may include load cells and the like which can detect a relatively small or weakpressing force, at an intermediate point between the arm 226 and the motor coupling arm 225. As a result, the guide roller 44 may be held in the direction for contracting the film feeding path to prevent the rotary shaft 220 from changing its position due to the signal from the sensor 230 and in the direction for expanding the loop-like film passage to allow the rotary shaft 220 to change its position due to contraction of the spring 227.

FIG. 7 illustrates a driver circuit which may drive the motor 224 according to a signal from the force sensor 230 to absorb the expansion and contraction of the film 2 and improve the film positioning accuracy. This operation will now be more fully explained with reference to the signal waveform charts shown in FIG. 8A through FIG. 8F. When intermittent film feeding is started by an intermittent feeding timing signal ST1 (FIG. 8A) as a trigger, the rotation speed V of the stepping motor 58 (FIG. 8B) increases gradually, then the rotation speed V is reduced after about a half frame of the film 2 is fed forward and stops. This operation cycle is repeated to feed the film 2 frame by frame (FIG. 8C). As the film 2 is fed in such a manner, the force sensor 230 outputs a force detection signal S51 in correspondence to the rotation speed V of the stepping motor 58 while the film 2 is running. When the film 2 stops, the force detection signal S51 is output according to the expansion and contraction of the film 2 (FIG. 8D). As a result, a sample holder (SH) 232 (FIG. 7) holds the force detection signal S51 for sampling according to a sampling pulse SP2 (FIG. 8E) which rises when the film 2 stops and outputs a sample hold signal SV (FIG. 8F) to the subtractor 233. The subtractor 233 subtracts this sample hold signal SV from a specified reference level REF to generate an error signal ER indicating the error of the present pressing force from the pressing force of the film 2 decided by the reference level REF. Such error signal ER is supplied to a low pass filter 234 wherein the signal bandwidth thereof is limited and an output is supplied therefrom to an amplifier circuit 235 so as to be amplified and supplied to the motor 224. As a result, the motor 224 is driven according to the signal level of the error signal ER.

Consequently, with regard to the configuration shown in FIGS. 6A and 6B, the motor 224 may be driven to change the position of the guide roller 44 so as to be pressed at a fixed force while the film 2 stops and the film 2 expands and contracts. Thus, the expansion and contraction of the film 2 is absorbed.

Although in describing the above embodiment, a stepping motor was utilized to drive an intermittent film feeding sprocket, the present invention is not so limited. For example, various types of motors including an AC motor may be utilized for intermittent film feeding.

Figure 9:
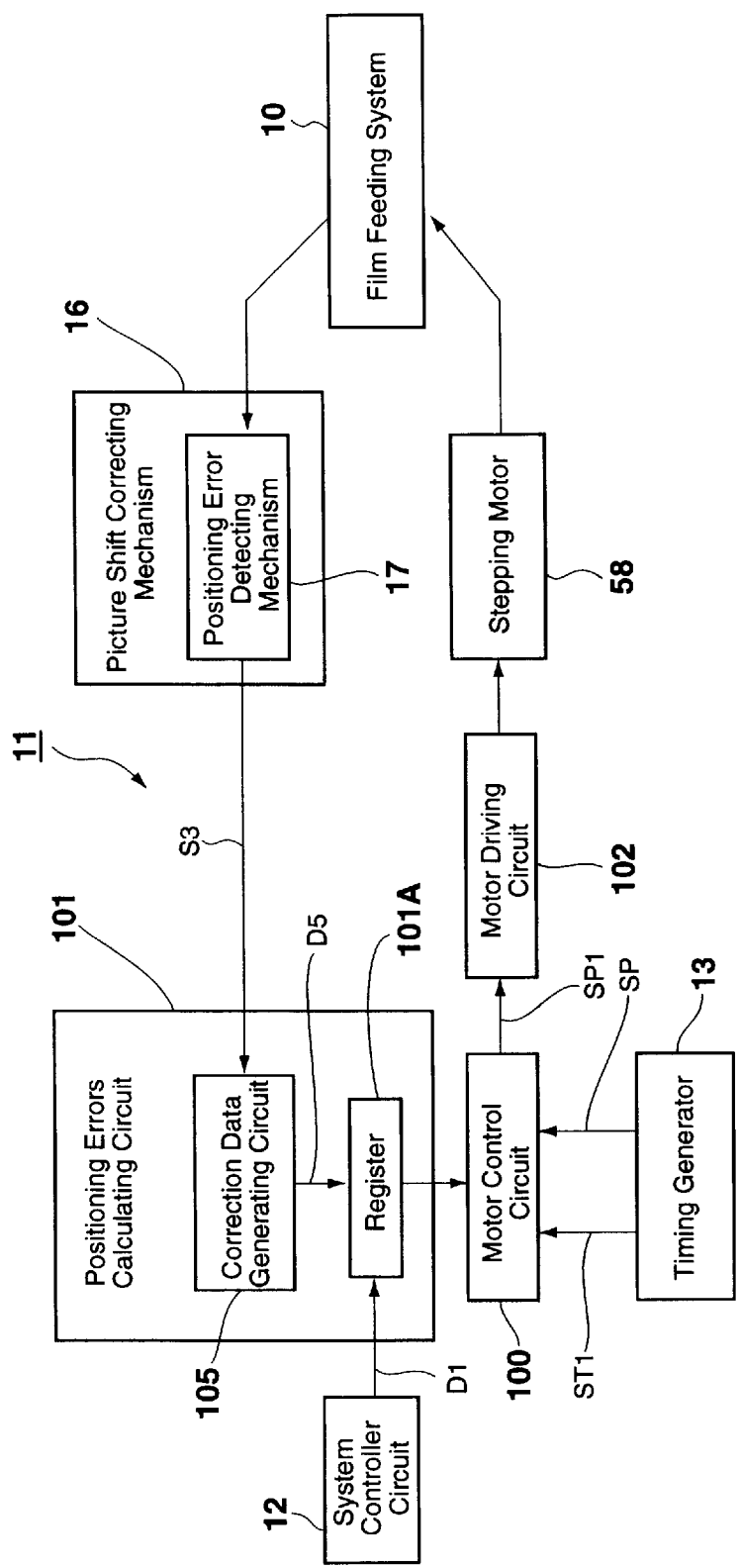
FIG. 9 is a diagram of the driving system used in FIG. 1.

FIG. 9 illustrates a circuit of the driving system 11 of the film feeding mechanism 9 shown in FIG. 1. The driving system 11 drives the stepping motor 58 (FIG. 4). In the film feeding mechanism 9, this driving system 11 effectively prevents the film 2 from being influence by an accumulation of positioning errors in the gate unit 70 to improve the positioning accuracy of the film 2. In other words, in the driving system 11, a motor control circuit 100 may periodically count pulses of a continuous pulse signal SP by an amount of a feeding length data D1 stored in a positioning errors calculating circuit 101 with a trigger using a timing signal ST1 output from the timing generator 13 with a period of feeding one frame, as hereinafter more fully described. The motor control circuit 100 then supplies the resulting pulse signal as a drive pulse signal SP1 to a motor driving circuit 102. The motor driving circuit 102 drives the stepping motor 58 according to the drive pulse signal SP1. Thus, the intermittent film feeding sprocket 50 (FIG. 3 through FIG. 5) is rotated at a timing which is synchronized with the timing signal ST1 to feed the film 2 intermittently.

The positioning errors calculating circuit 101 loads the feeding length data D1 output from the system controller circuit 12 into a built-in register 101A when the telecine apparatus 1 is started up, so that the feeding length data D1 may be output to the motor control circuit 100. Then, the positioning error calculating circuit 101 generates feeding length correcting data D5 for the intermittent feeding of the subsequent film 2 in reference to the positioning error detecting signal S3 output from the positioning error detecting mechanism 17. In other words, the correcting data generating circuit 105 performs analog/digital conversion for the positioning error detecting signal S3 according to a quantization step size corresponding to the resolution of the stepping motor 58 so that feeding length correcting data D5 may be generated in correspondence with the number of pulses for the stepping motor 58. This data D5 is used to correct the feeding length data D1 stored in the register 110A. Consequently, the driving system 11 can update the frame feeding length with reference to the previous result of frame feeding to improve the positioning accuracy of the film 2.

If the previous frame feeding length is excessively long by a length corresponding to 1 pulse of the stepping motor 58, the subsequent frame feeding length is reduced by one pulse from the previous feeding length for feeding the film 2. On the other hand, if the previous frame feeding length is shorter by one pulse for the stepping motor 58, the subsequent frame feeding is carried out by adding the feeding length corresponding to this one pulse to the previous frame feeding length for feeding the film 2. Thus, the film feeding mechanism 9 can provide accurate intermittent film feeding by effectively avoiding accumulation of positioning errors in the gate unit 70 shown in FIG. 3 even when the film 2 expands or contracts.

FIG. 10 illustrates a cross sectional view of the gate unit 70 provided for the positioning error detecting mechanism 17. As shown therein, the position of the film 2 is detected in the gate unit 70 with reference to the capacitance between the electrodes arranged in the fixed picture gate 71 and the movable picture gate 72 provided in the gate unit 70.

In the gate unit 70, a guide shoe 110 is arranged on the base of the fixed picture gate 71 so that the movable picture gate 72 facing the guide shoe 110 can press and guide the film 2. The supply side and the take-up side of the guide shoe 110 are arranged symmetrically as shown in the top view of FIG. 11A and the cross sectional view of FIG. 11B, and electrode assemblies 113 and 114 are bonded on a frame 112 which may be fabricated by machining a conductor material such like stainless steel or the like. The frame body 112 has a width almost the same as that of the film 2 with a larger width portion in the center, wherein the electrode assemblies 113 and 114 are arranged. Furthermore, the frame 112 has an opening 116 positioned in the center of the guide shoe 110 and between the electrode assemblies 113 and 114 as shown in FIG. 11A and screw holes 119 provided on both sides of the opening 116. The guide shoe 110 is fixed to a base 120 of the fixed picture gate 71 by screws in the screw holes 119. When the guide shoe 110 is fixed in such a manner, light from the light source 15 may be projected through the opening 116 and onto the film 2.

The electrode assemblies 113 and 114 may be formed by bonding an electrode 121 made of a conductor ceramic material in a recess of the base 120 made of an insulating ceramic material prior to polishing their surfaces. Thus, the guide shoe 110 includes the electrode assemblies 113 and 114 formed with an insulating ceramic material and a conductor ceramic material which have a high resistance to wear, thereby providing the electrode assemblies 113 and 114 with relatively high wear resistance. As shown in FIG. 11B, a terminal 122 is connected to each electrode 121 via the through-hole of the base 120 and is further connected to the positioning error detecting mechanism circuit. In the guide shoe 110, each electrode may be arranged as described below in relation to the film 2 which may be a 35 mm standard movie film or the like.

Figure 12:
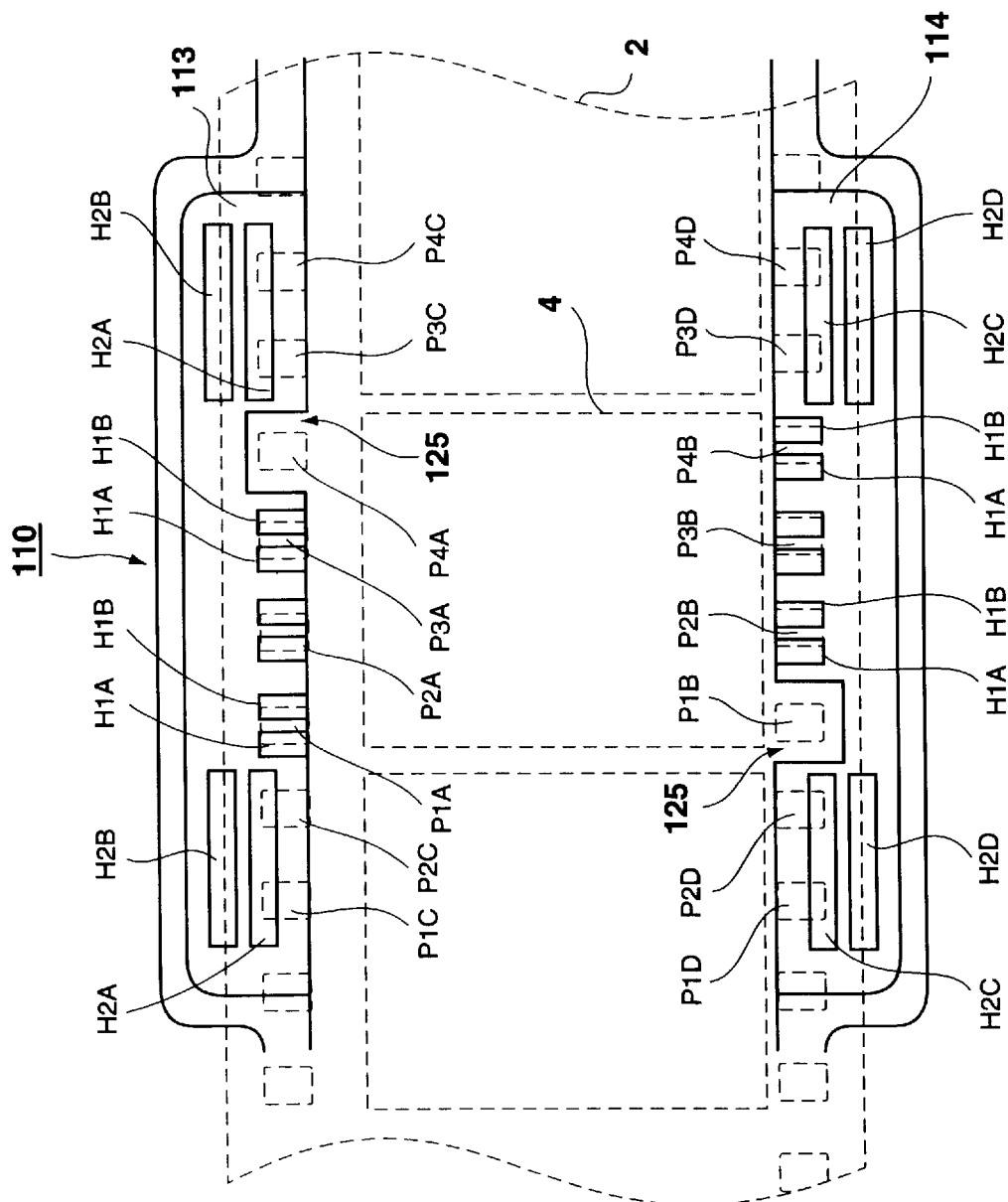
FIG. 12 is a view of the periphery of an opening of the guide shoe of FIG. 11A.

If the picture in the frame 4 picked up by the television camera 19 is indicated as being at a correct position by monitoring the video signal S1 without any correction for the picture shift by the optical axis correcting mechanism 18, the stop position of the film 2 is correct. As shown in FIG. 12, a cutout 125 is formed in the electrode assembly 113 so as to be positioned under a perforation P4A, which is the closest one to the take-up side of the four perforations P1A to P4A on the side of the frame 4 to be picked up, while the film 2 is stopped at this correct position. Similarly, in the electrode assembly 114, a cutout 125 is formed so as to be positioned under a perforation P1B, the closest one to the supply side of the perforations P1B to P4B on the other side of the frame 4. As a result, in the gate unit 70, the light from the light source 15 may be projected to the perforations P4A and P1B intermittently through these cutouts 125. These perforations P4A and P1B which are lighted intermittently can be visually checked for an easy determination of a picture shift. In other words, during operation of the apparatus 1, perforations P4A and P1B may be projected on a monitor or screen, and the movement of such perforations may provide an indication of the picture shift status of the film 2. For example, if a picture shift is seen while the perforations P4A and P1B are still, the picture shift may be caused by the picture printing position on the film, not by film positioning error caused by frame by frame film feeding.

With regard to the other perforations P1A to P3A and P2B to P4B, a pair of electrodes H1A and H1B are respectively arranged as a pair for each perforation in the electrode assemblies 113 and 114. The pair of electrodes H1A/H1B may have the same shape and may be arranged symmetrically to each of the perforations P1A to P3A and P2B to P4B in the film feed direction. Consequently, the pair of electrodes H1A/H1B are kept at a value indicating that the capacitance between supply side electrode H1A and movable picture gate 72 is equal to the capacitance between the take-up side electrode H1B and the movable picture gate 72 while the film 2 stops at a correct position in the film feed direction. However, if the film 2 is shifted from a correct stop position, a difference is generated between the above two capacitances which corresponds to such shifted distance. Such relationship between distance and capacitance differences is due to the fact that the larger the film covering an electrode is, the larger the capacitance becomes, since the film dielectric constant is higher than that of air.

As such, the electrode assemblies 113 and 114 detect the difference between the above two capacitances formed by the pair of electrodes H1A and H1B. If three pairs of electrodes H1A and H1B are respectively arranged in the longitudinal direction of the film 2 at standard pitches of the perforations 3 in such a manner and distributed symmetrically in the same area and in the same quantity at both sides of the film 2, the difference between the capacitances caused by the electrodes H1A and H1B is detected to allow correct detection of positioning errors in the longitudinal direction of the film 2 to improve the accuracy of the positioning error detection and output high quality processing results even when the film 2 expands and contracts in the longitudinal and/or width directions.

The electrode assembly 113 has two electrodes H2A arranged across the perforations P1C, P2C, P3C, and P4C provided on the supply and take-up sides at both sides of four perforations P1A to P4A. Furthermore, outside each of the electrodes H2A is formed an electrode H2B having the same shape. In the other electrode assembly 114, two electrodes H2C are arranged across the perforations P1D, P2D, P3D, and P4D. Outside each of the two electrodes H2C is formed an electrode H2D having the same shape.

The inside electrodes H2A and H2C are arranged such that the outer edge of the film 2 exceeds each of the electrodes H2A and H2C. The outside electrodes H2B and H2D are arranged such that the outer edge of the film 2 is approximately in the center of each of the electrodes H2B and H2D. Consequently, in the electrode assemblies 113 and 114, when the film 2 is shifted laterally or in the width direction, the capacitance between an electrode H2A/H2C or H2B/H2D and the movable picture gate 72 changes such that if one capacitance is increased, the other capacitance is decreased. While the film stops at a correct position, those capacitances are kept at the same value.

Symmetrically arranging a plurality of electrodes may enable film position to be detected. That is, capacitance change of a single electrode may be affected by factors other than the film position, for example, dielectric constant change by temperature, influence of a detector by input capacity, and so forth. However, if a plurality of electrodes are arranged symmetrically, such other factors may produce the same conditions or changes for all of them. As a result, only the capacitance change caused by a film position change may be detected. Thus, when the electrodes are arranged such that when one capacitance increases, the other capacitance decreases, a film position change may be detected easily by checking only the difference between capacitances even when the capacitance change is relatively small.

Consequently, the electrode assemblies 113 and 114 can detect a difference between the capacitance formed by the electrodes H2A and H2D and the capacitance formed by the electrodes H2B and H2C which corresponds to a change in direction of the film 2, thereby detecting positioning errors in the width direction of the film 2. If four pairs of electrodes H2A to H2D are arranged symmetrically around the frame 4, the difference between capacitances formed by these electrodes can be detected to detect positioning errors in the width direction of the film 2 in reference to a correct stop position regardless of whether the film 2 has expanded or contracted in the longitudinal or width direction so as to improve the detecting accuracy and output higher quality processing results.

As shown in FIG. 10, the movable picture gate 72 includes a film holder 130 held on the base 131 which may be moved up/down by a handle (not illustrated). The film holder 130 is pressed by springs 132 against the guide shoe 110. In other words, the film holder 130 is arranged on the take-up side and the supply side of the opening 116 so as to avoid the opening 116 (FIG. 11A) of the guide shoe 110. Furthermore, the film holder 130 has a recess in its width direction corresponding to the frame structure 112 (FIG. 11A) of the guide shoe 110. As a result, the frame 4 and the sound track 5 may be protected from damages.

The film holder 130 can change its position according to the force of the spring 132 and the thickness of the film 2 to absorb local changes of the film thickness caused by foreign matters stuck on the film as, for example, may occur when the periphery of any perforation 3 is deformed. The film holder 130 can also reduce positional changes of the film 2 from the electrode assemblies 113 and 114 of the guide shoe 110 in the vertical or thickness direction by pressing the film 2 against the guide shoe 110.

Furthermore, the movable picture gate 72 holds an electrode member 134 separately from the film holder 130 such that the member 134 faces the electrode assemblies 113 and 114 of the guide shoe 110. The electrode member 134 may be entirely fabricated of a metallic material so as to form an electrode which faces an electrode 121 of the guide shoe 110 and is grounded via the base 131. The electrode member 134 is arranged so as to have a relatively small or micro clearance G from the film by use of a recess 136 formed on the base 131 and held by the movable picture gate 72. Consequently, the movable picture gate 72 separates the film holder 130 from the electrode member 134 to hold the electrode member 134 away from the opposite electrode 121 by a fixed interval even when the film holder 130 goes up/down due to a deformed perforation to prevent the capacitance from changing. Thus, the movable picture gate 72 may avoid deterioration of positioning error detection accuracy which may be caused by local changes in thickness of the film 2.

The electrode member 134 may be pressed by a spring or springs 135 toward or against the film 2 and held by the movable picture gate 72. Consequently, the movable picture gate 72 allows the electrode member 134 to rise at a thicker portion of the film, for example, at a joint, to effectively protect the film 2 from damages.

Figure 13:
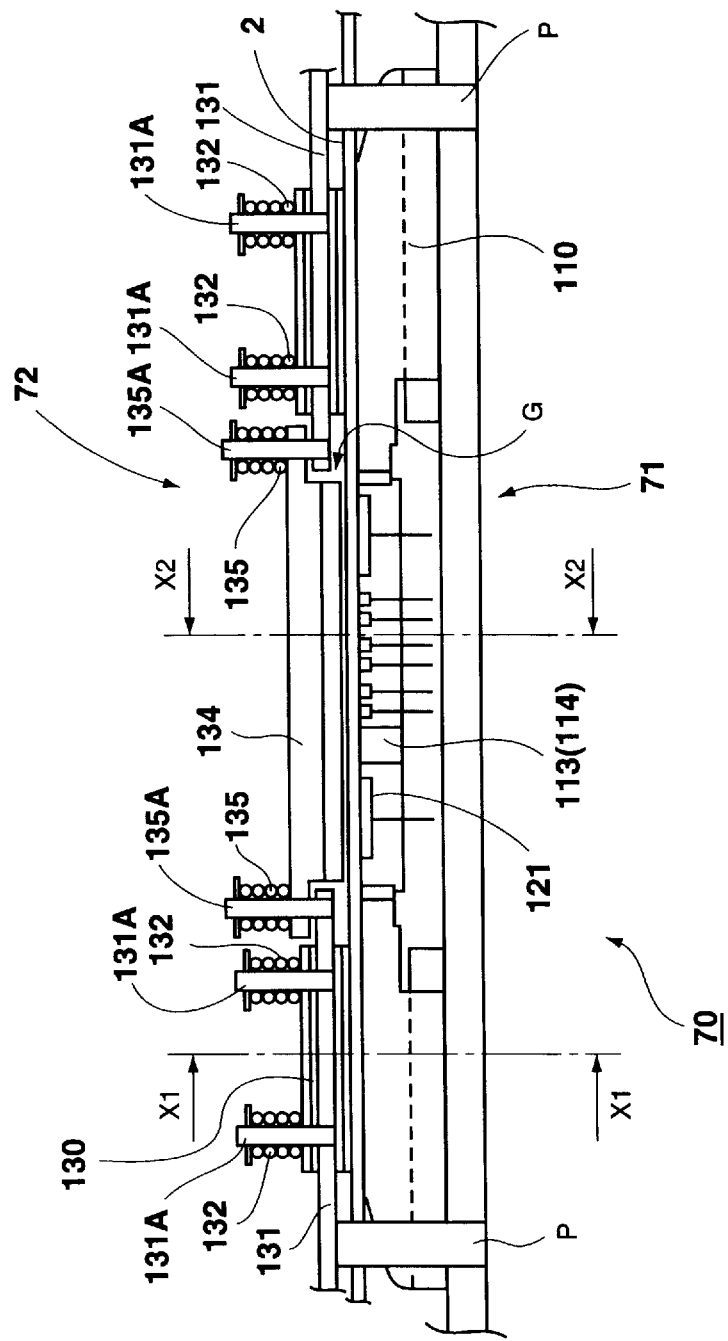
FIG. 13 is a cross-sectional view of the gate unit in a positioning error detecting mechanism in accordance with another embodiment of the present invention.
Figure 14:
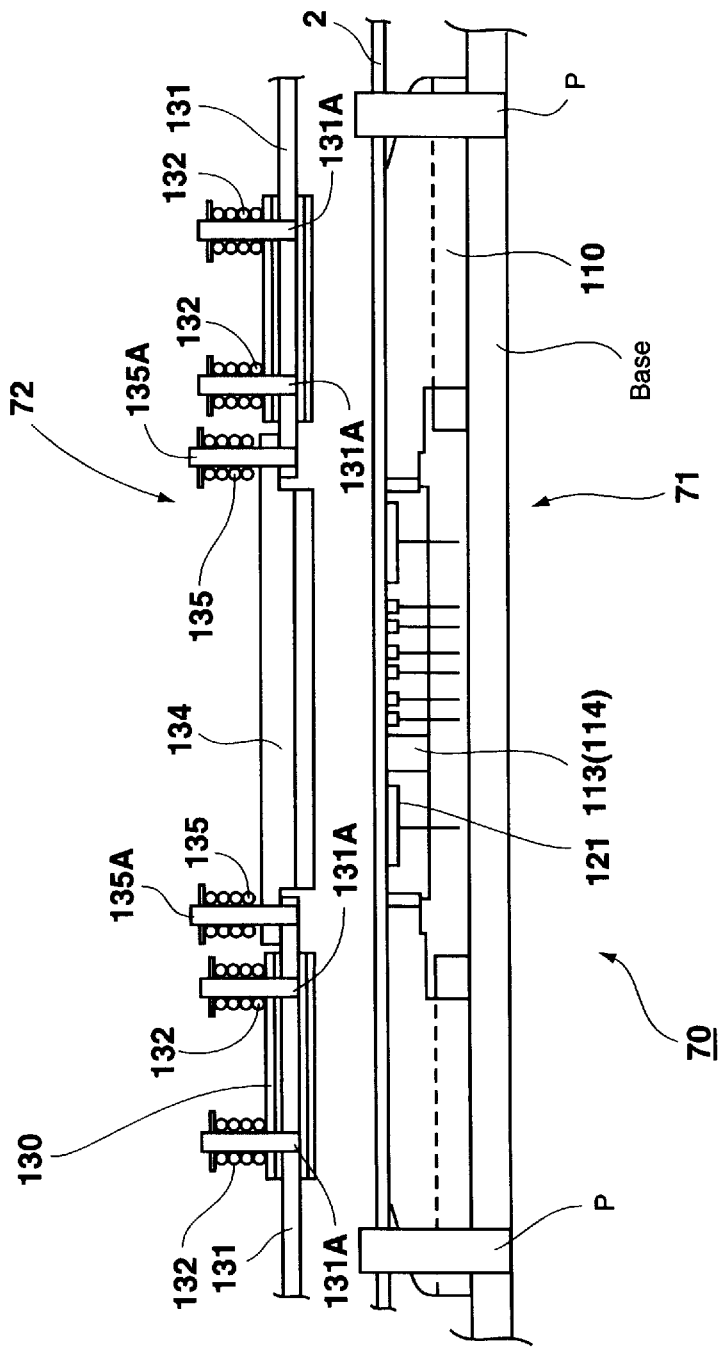
FIG. 14 is a cross-sectional view of a movable picture gate in an up position.

FIGS. 13 and 14 show another embodiment of the gate unit 70. FIG. 13 illustrates the movable picture gate in a down position and FIG. 14 shows the movable picture gate in an up position. In this embodiment, the elements corresponding to those of the gate unit 70 of FIG. 10 have the same reference numerals.

Figure 15:
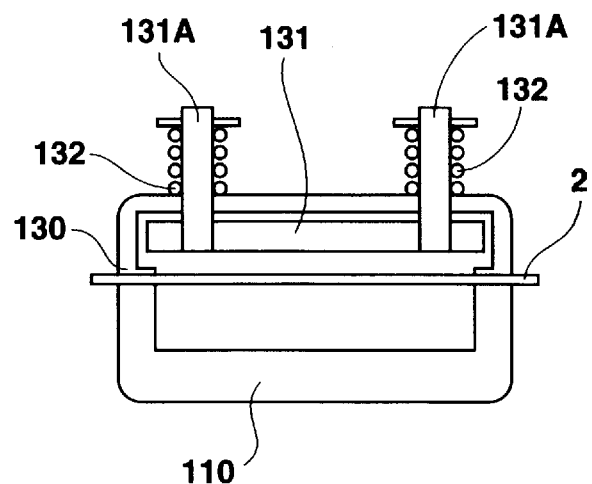
FIG. 15 is a cross-sectional view along a line X1—X1 shown in FIG. 13.

The movable picture gate 72 provided in the gate unit 70 may have a base 131 formed of a plate-like member having an opening in the center which may be stopped by a positioning post arranged on the fixed picture gate 71 side so as to be positioned in relation to the guide shoe 110. The base 131 holds two guide pins 131A erected before and after the opening. Each of the guide pins 131A is inserted in a spring 132, which presses the film holder 130 against the guide shoe 110. FIG. 15 shows a cross section view along the line X1—X1 in FIG. 13. The film holder 130 is formed so that its tip becomes flat which may press the film 2 against the guide shoe 110. The film holder 130 can thus change its position according to the force of the spring 132 and the thickness of the film 2 which may be locally changed due to foreign matters and so forth stuck on the film. Further, thickness changes due to a deformation of a perforation 3 at its periphery or the like may also be absorbed. Furthermore, the film holder 130 can also reduce positional changes of the film 2 from the electrode assemblies 113 and 114 of the guide shoe 110 in the thickness direction by pressing the film 2 against the guide shoe 110.

Furthermore, the movable picture gate 72 holds an electrode member 134 separately from the film holder 130 such that the member 134 faces the electrode assemblies 113 and 114 of the guide shoe 110. In other words, the base 131 holds erected guide pins 135A, each of which is inserted in a spring 135 which presses the electrode member 134 toward or against the guide shoe 110.

Figure 16:
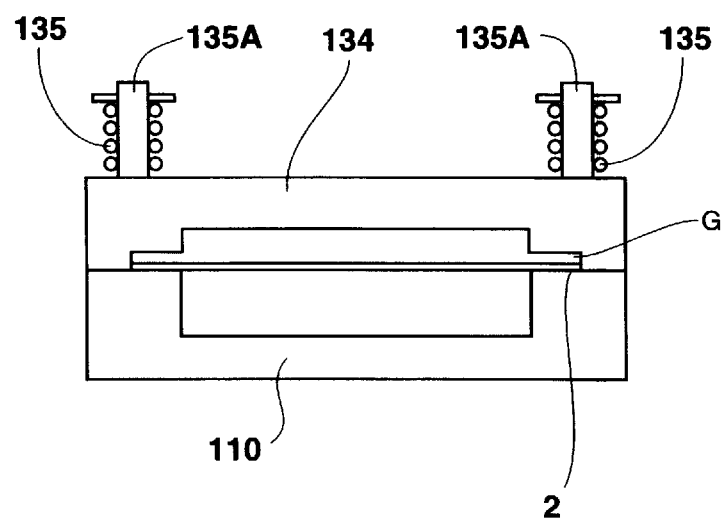
FIG. 16 is a cross-sectional view along a line X2—X2 shown in FIG. 13.

The electrode member 134 may be fabricated entirely from a metallic material so as to form an electrode which faces an electrode 121 of the guide shoe 110 and is grounded via the base 131. As shown in FIG. 16, which illustrates a cross section of the line X2—X2 in FIG. 13, the electrode member 134, pressed by the springs 135 from both inside and the edge of the base 131, has a relatively small or micro clearance G from the film and may be held by the movable picture gate 72.

Consequently, the movable picture gate 72 separates the film holder 130 from the electrode member 134 so as to hold the electrode member 134 away from the opposite electrode 121 by a fixed interval even when the film holder 130 goes up/down due to a deformed perforation or the like so as to prevent the capacitance from changing.

Although, in the above embodiment, the film holder 130 may be pressed and held by the spring 132, the film holder itself may also be formed so that its position can be changed using a plate spring and the like.

Figure 17:
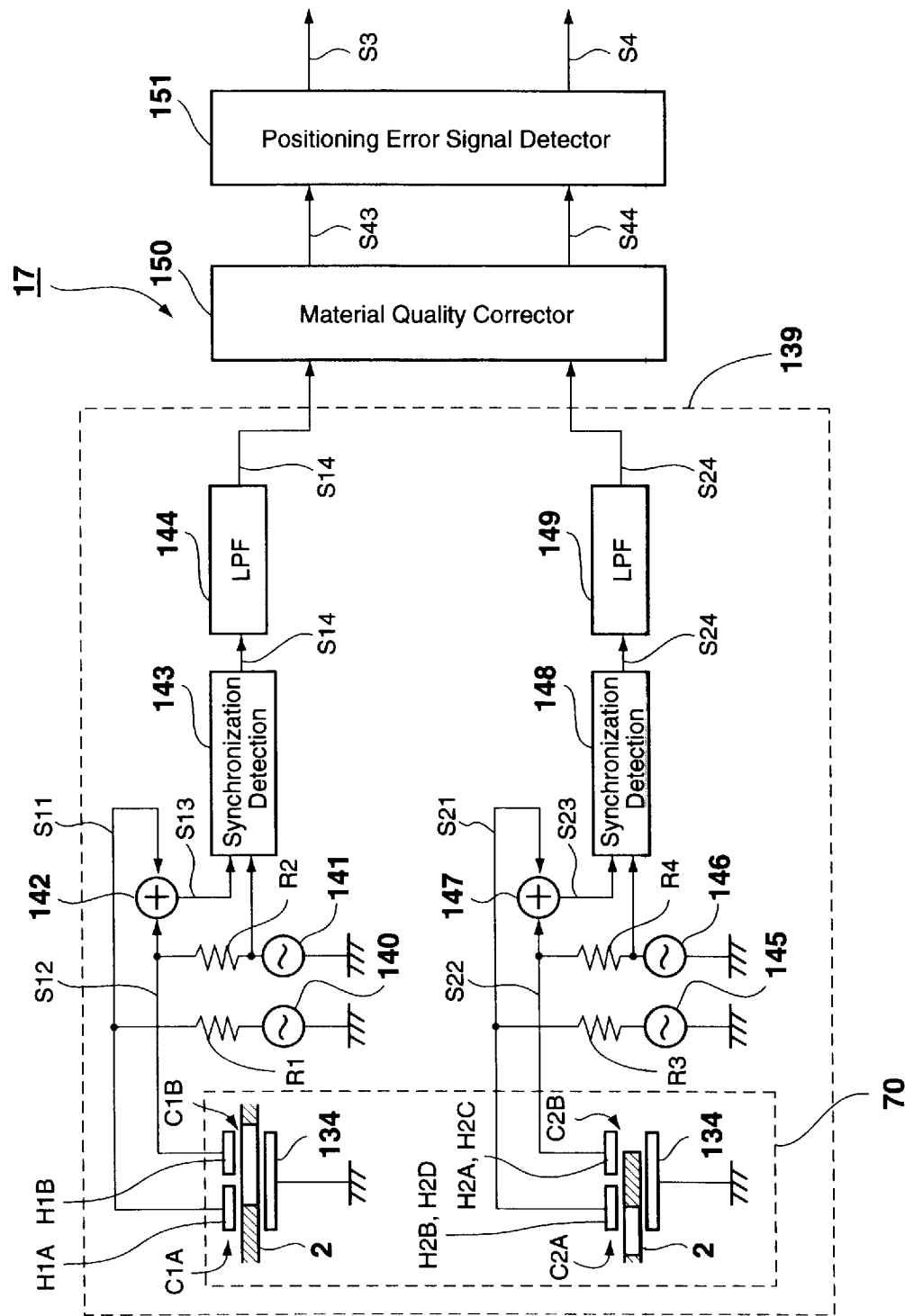
FIG. 17 is a diagram of a film positioning error detecting mechanism.

A circuit diagram of the positioning error detecting mechanism 17 is illustrated in FIG. 17. In the positioning error detecting mechanism 17, electrodes H1A and H1B may be respectively formed as a pair in the longitudinal direction of the film 2 and the electrodes H1A/H1B on the supply side may be respectively connected to the electrodes H1A/H1B on the take-up side. Thus, a first condenser or capacitor C1A is formed with a plurality of electrodes H1A and the electrode member 134 on the supply side, and a second condenser or capacitor C1B is formed with a plurality of electrodes H1B and the electrode member 134 on the take-up side, so that the difference of capacitance between H1A and H1B can be detected.

In the positioning error detecting mechanism 17, the first and second condensers C1A and C1E are connected serially to resistors R1 and R2, respectively, in a differential signal generator 139. These resistors R1 and R2 are connected to oscillators 140 and 141, respectively. As a result, the positioning error detecting mechanism 17 divides the oscillation output from the oscillator 140 using a voltage divider of both the first condenser C1A and the resistor R1 to generate a voltage dividing signal S11 whose level changes according to capacitance changes of the first condenser C1A. In the same way, the mechanism 17 divides the oscillation output from the oscillator 141 using a voltage divider of both the second condenser C1B and the resistor R2 to generate a voltage dividing signal S12 whose level changes according to capacitance changes of the second condenser C1B.

The oscillators 140 and 141 output oscillation signals which may be reversed in phase from each other and approximately equal to each other in signal level. The resistors R1 and R2 may have the same resistance value. Consequently, an adder 142 adds voltage dividing signals S11 and S12 to form a signal S13 whose envelope changes according to the difference of capacity or capacitance between the first and second condensers or capacitors C1A and C1B.

A cycle detector 143 receives the signal S13 output from the adder 142 asynchronously with the signal from the oscillator 141 and outputs a signal S14 whose level changes according to the capacitance difference between the first and second condensers C1A and C1B. To eliminate unnecessary high frequency elements in the S14 signal, a low-pass filter (LPF) 144 is used. A capacitance difference occurs when a perforation changes its position in relation to the electrode H1A on the supply side and the electrode H1B on the take-up side in the first and second condensers C1A and C1B. As such, the signal S14 indicates a relative position of the perforation 3 in relation to the electrodes H1A and H1B. Thus, when the film 2 stops, the signal S14 indicates a stop position of the perforation 3 and the positioning error detecting mechanism 17 generates a positioning error detecting signal S3 concerning the feeding direction of the film 2 in accordance with the output signal S14.

In the same way, in the positioning error detecting mechanism 17, electrodes H2A and electrodes H2C may be respectively formed as a pair in the width direction of the film 2 and electrodes H2A/H2C on the supply side may be respectively connected to those on the take-up side to correspond to the positional change of the film 2 in the width direction. A third condenser or capacitor C2A is formed with the electrodes H2A, H2C, and the electrode member 134. Furthermore, electrodes H2B and H2D which form a pair respectively on supply and take-up sides are connected and combined with the electrode member 134 to form the fourth condenser or capacitor C2B. Consequently, the positioning error detecting mechanism 17 can detect the capacitance difference between electrodes H2A and H2B, as well as between electrodes H2B and H2D even in the width direction of the film 2.

Furthermore, in the positioning error detecting mechanism 17, the third and fourth condensers or capacitors C2A and C2B are connected serially to resistors R3 and R4, respectively. The resistors R3 and R4 are then connected to the oscillators 145 and 146, respectively. As a result, the positioning error detecting mechanism 17 can generate a voltage dividing signal S21 whose level changes according to the capacity or capacitance change of the third condenser C2A and a voltage dividing signal S22 whose level changes according to the change of the fourth condenser C2B capacitance.

The oscillators 145 and 140 output oscillation signals which may be reversed in phase from each other and approximately equal to each other in signal level. The resistors R3 and R4 may have the same resistance value. An adder 147 adds voltage dividing signals S21 and S22 to form a signal S23 whose envelope changes according to the capacitance difference between the third and fourth condensers C2A and C2B.

A cycle detector 148 receives or detects the signal S23 output from the adder 147 asynchronously with the signal from the oscillator 146 and outputs a signal S24 whose level changes according to the capacitance difference between the first and second condensers C2A and C2B. To eliminate unnecessary high frequency elements in the S24 signal, a low-pass filter (LPF) 149 is used. A capacitance difference may occur when the film 2 changes its position in relation to the electrodes H2A, H2C, H2B, and H2D, so that the output signal S24 may provide an indication of the position of the film 2 in the width direction. As such, when the film 2 stops, the signal S24 indicates a stop position in the width direction. The positioning error detecting mechanism 17 generates a positioning error detecting signal S4 concerning the width direction of the film 2 in accordance with the output signal S24.

A material quality corrector 150 may correct the signal level of the output signals S14 and S24 that change according to the material quality and so forth of the film 2. A positioning error detector 151 may sample and hold output signals S43 and S44 from the material quality corrector 150 when the film 2 stops and may generate the positioning error detecting signals S3 and S4.

Figure 18:
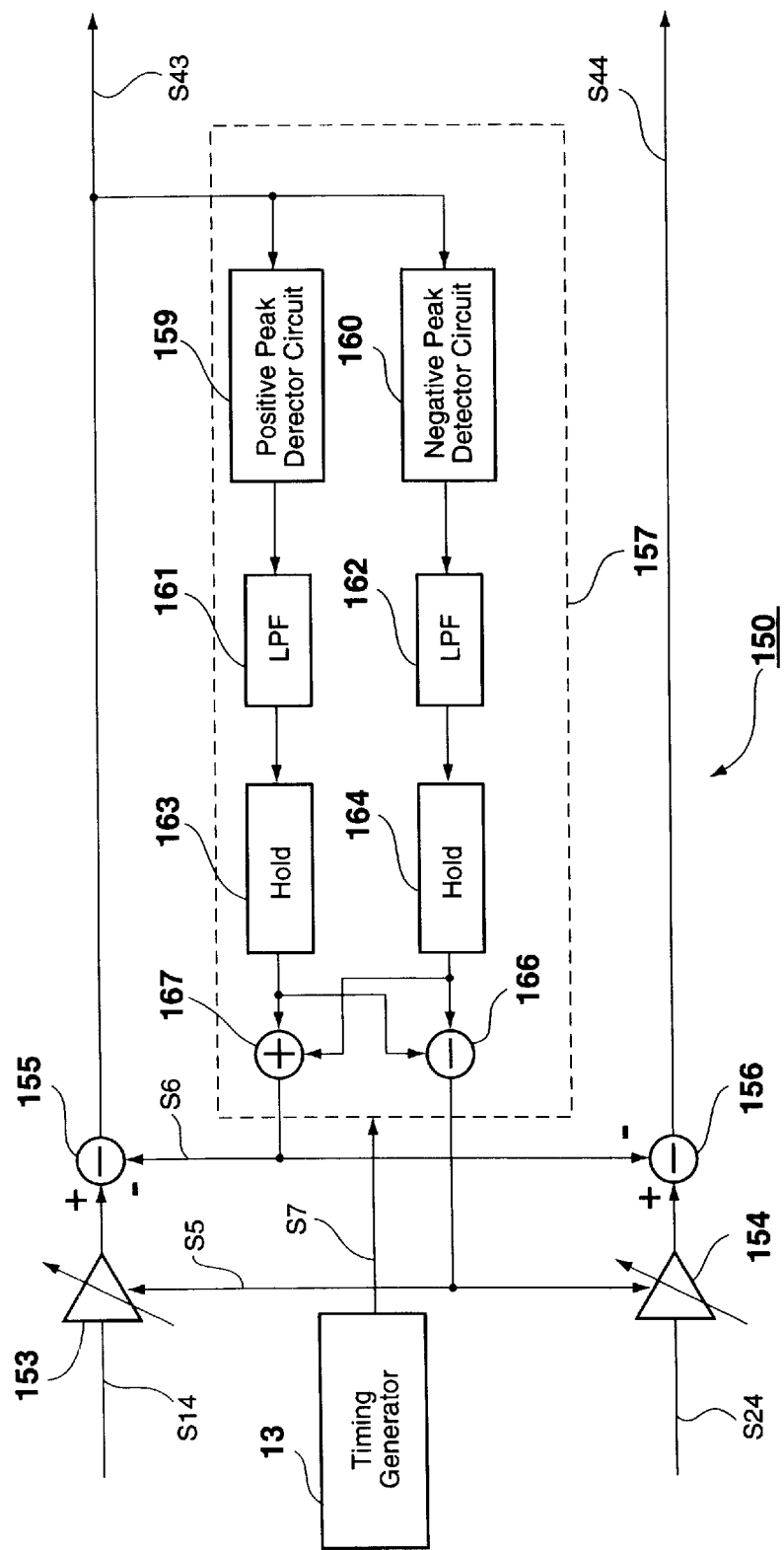
FIG. 18 is a diagram of a material quality corrector of the film positioning error detecting mechanism circuitry of FIG. 17.
Figure 19:
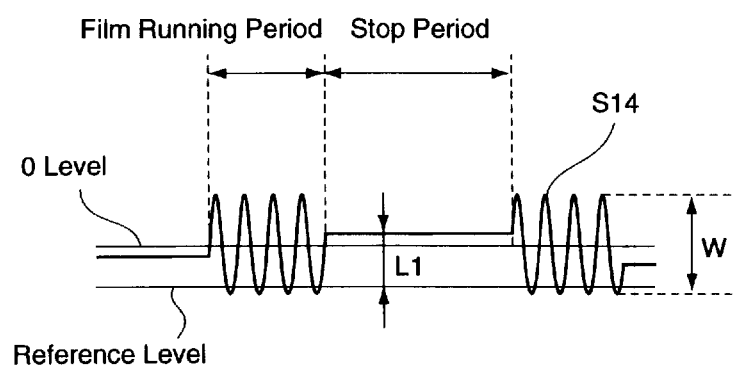
FIG. 19 is a signal waveform to which reference will be made in explaining an operation of the material quality corrector of FIG. 18.

The material quality corrector 150 is further illustrated in FIG. 18. As shown therein, the material quality corrector 150 may receive and correct the signal level of a signal waveform of an output signal. An example of such waveform is shown in FIG. 19. More specifically, the level of the output signal S14 is changed to a sine wave according to an amplitude decided by the dielectric constant or the like of the film 2 when the position of the perforation 3 is changed in relation to the electrodes H1A and H1B while the film 2 is running. Consequently, the material quality corrector 150 corrects the levels of the output signals S14 and S24 for a subsequent stop period according to the amplitude and the DC level of the output signal S14 assumed while the film 2 is running. Thus, changes of the positioning error detecting signals S3 and S4 caused by the material quality of the film 2 can be compensated.

In other words, the material quality corrector 150 corrects the amplitude of the output signals S14 and S24 using variable gain amplifier circuits 153 and 154 while the film 2 stops and corrects the DC level of the output signals S14 and S24 using subtractors 155 and 156. That is, material quality corrector 150 generates correction signals S5 and S6 from the output signal S14 using a correction signal generator 157 while the film 2 is running and corrects the amplitude and DC level of the output signals S14 and S24 using the correction signals S5 and S6. A signal S43 from the subtractor 155 is supplied to a positive peak detector circuit 159 and a negative peak detector circuit 160 to respectively detect positive and negative peaks of the output signal S43 sequentially in reference to a timing signal S7 supplied from a timing generator 13 while the film 2 is running. Low-pass filters 161 and 162 are used to limit the bandwidth of the signals 160 from the positive and negative peak detector circuits 159 and 160, respectively, so as to average the results detected in the positive and negative peak detector circuits 159 and 160. That is, since 4 perforations 3 are assigned to each frame of the film 2, four cycles of sine wave ripples are repeated in the output signal S43 for a period while the film is running. Consequently, peak detection results are averaged to effectively avoid deterioration of positioning error detecting accuracy which may be caused by up/down shifting of the film 2. The hold circuits 163 and 164 sample-hold and output the signals supplied from the low-pass filters 161 and 162 in accordance with the timing signal supplied from the timing generator 13 each time a film running period is ended. The subtractor 166 outputs the gain control signal from the hold circuits 163 and 164 as the correction signal S5 while the film 2 is running. While the film 2 stops, the subtractor 166 subtracts the sample-hold result from the hold circuits 163 and 164 to output the correction signal S5. Consequently, the correction signal generator 157 sets the gains of both variable gain amplifier circuits 153 and 154 as values for setting the amplitude A of the output signal S43 to a fixed value to correct the signal level of the output signal S43 while the film 2 stops. The adder 167 corrects the output of the correction signal S6 according to the result of the hold circuits 163 and 164 while the film 2 is running. While the film 2 stops, the adder 167 adds the sample hold results of the hold circuits 163 and 164 and outputs the result as the correction signal S6. Consequently, the correction signal generator 157 supplies an offset voltage for setting the DC level of the output signal S43 to a fixed DC level L1, to the subtractors 155 and 156 to correct the signal levels of the output signals S43 and S44 while the film 2 stops.

Figure 20:
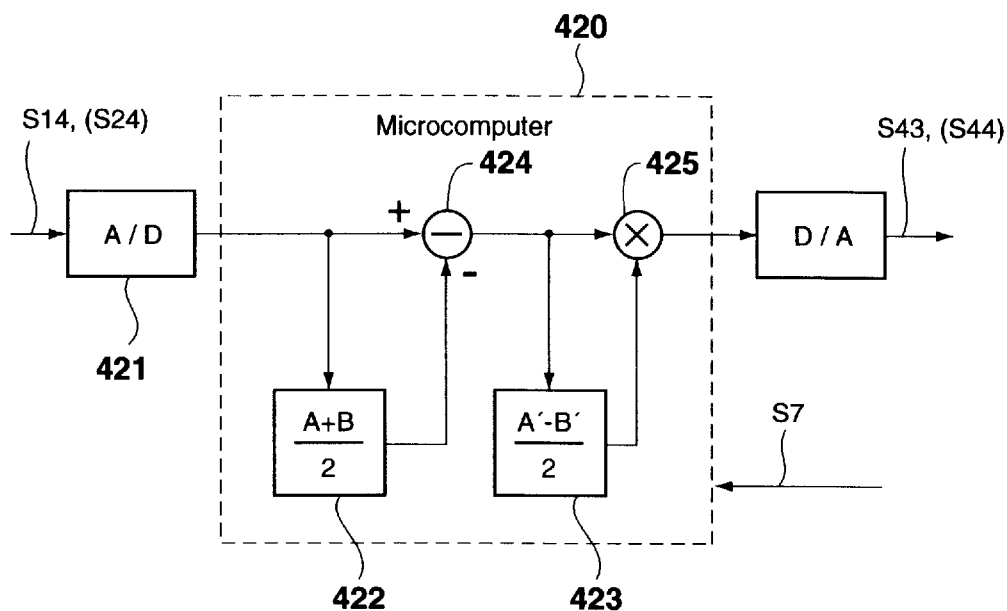
FIG. 20 is a diagram of the material quality corrector in accordance with another embodiment of the present invention.

According to the above embodiment, positioning errors may be properly detected according to the capacitance difference between electrodes 121 and 134 arranged on both sides of a movie film even when changes occur in the material quality, thickness, and so forth of the film if the gain and the DC level are compensated in reference to the amplitude and DC level while the film is running. Further, in the above embodiment, the amplitude and DC level are detected according to peak detection result while the film is running. However, the present invention is not so limited and various methods for detecting wide-ranged amplitude and DC level may also be applied. For example, as shown in FIG. 20, a microcomputer 420 may be used to detect amplitudes and DC levels to correct gains and DC levels. In other words, in the configuration shown in FIG. 20, an analog-digital (A/D) converter 421 is used to convert the signals S14 and S24 supplied from the differential signal generator 139 (FIG. 17) to digital signals and to supply the same to the microcomputer 420. In the microcomputer 420, the sequentially received digital signals are temporarily stored in a built-in memory, then processed in accordance with a predetermined procedure to correct the gain and DC level of the signals.

Figure 21A:
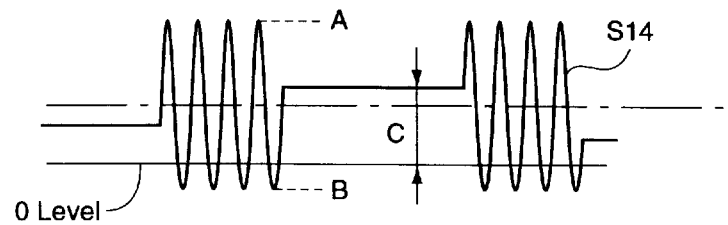
FIG. 21A through FIG. 21C are signal waveforms to which reference will be made in explaining an operation of the material quality corrector of FIG. 20.
Figure 21B:
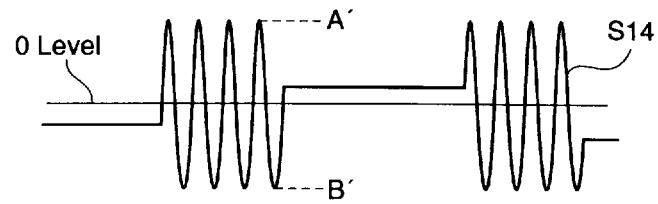

The operation of the configuration shown in FIG. 20 will now be further described with reference to the digital waveforms shown in FIGS. 21A–21C. The microcomputer 420 compares the signal levels of continuous output signal S14 to detect the positive peak A and the negative peak B of the output signal S14 (FIG. 21A), then finds an average value from each of these A and B peak values. Afterwards, the microcomputer 420 adds the averaged positive and negative peak values A and B, then divides the result by 2 to detect or obtain the DC level of the output signal S14. To perform such function, the microcomputer 420 includes a function block (A+B/2) 422 for detecting DC levels. Subsequently, the microcomputer 420 subtracts each average value (A', B') of the positive peak A and the negative peak B, then divides the result by 2 to detect the amplitude of the output signal S14. To perform such function, the microcomputer 420 includes a function block (A'–B'/2) 423 for detecting amplitudes.

Figure 21C:
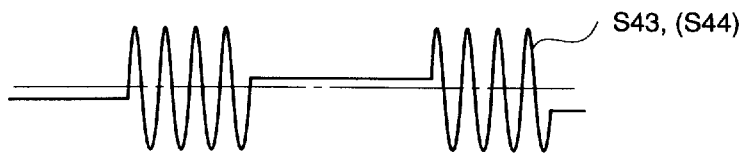

When the DC level and amplitude of the object output signal are detected in such a manner while the film 2 is running, the microcomputer 420 reads the output signals S14 and S24 held in a memory while the film 2 stops and subtracts the DC level detected in each digital value from the read signals (FIG. 21B), then multiplies the read signals by each digital value according to the detected amplitude to provide the proper gain and outputs the result (FIG. 21C). To perform such function, the microcomputer 420 includes a function block DC level corrector 424 having a subtractor configuration and a function block gain corrector 425 having a multiplier configuration. Thus, the microcomputer 420 can correct the signal level for each film stop period according to the signal level detection result assumed while the film 2 is running and output the corrected signal.

The microcomputer as shown in FIG. 20 can also be used for signal level correction to obtain the same effect as in the first embodiment.

In the above embodiment, DC level correction is obtained after amplitude correction in the material quality corrector. However, such DC level correction may be omitted if the resultant detecting accuracy is sufficient for the actual operation.

Furthermore, in the above embodiment, electrodes are described as being fabricated from ceramics. However, since this invention allows these electrodes to be formed in various shapes and arrangements, these electrodes may be fabricated from various other materials such a metal and the like. As an example, a conductor electrode may be arranged in a recess of an insulating material, such as a plastic material.

Furthermore, in the above embodiment, a voltage divider for detecting positioning errors is formed by a condenser having electrodes that face each other and resistors. However, various other methods may also be used in such detection of positioning errors. For example, another condenser may be utilized instead of resistors for forming a voltage divider, or a coil (instead of resistors) may be utilized for detecting positioning errors according to changes of resonant frequency.

Figure 22:
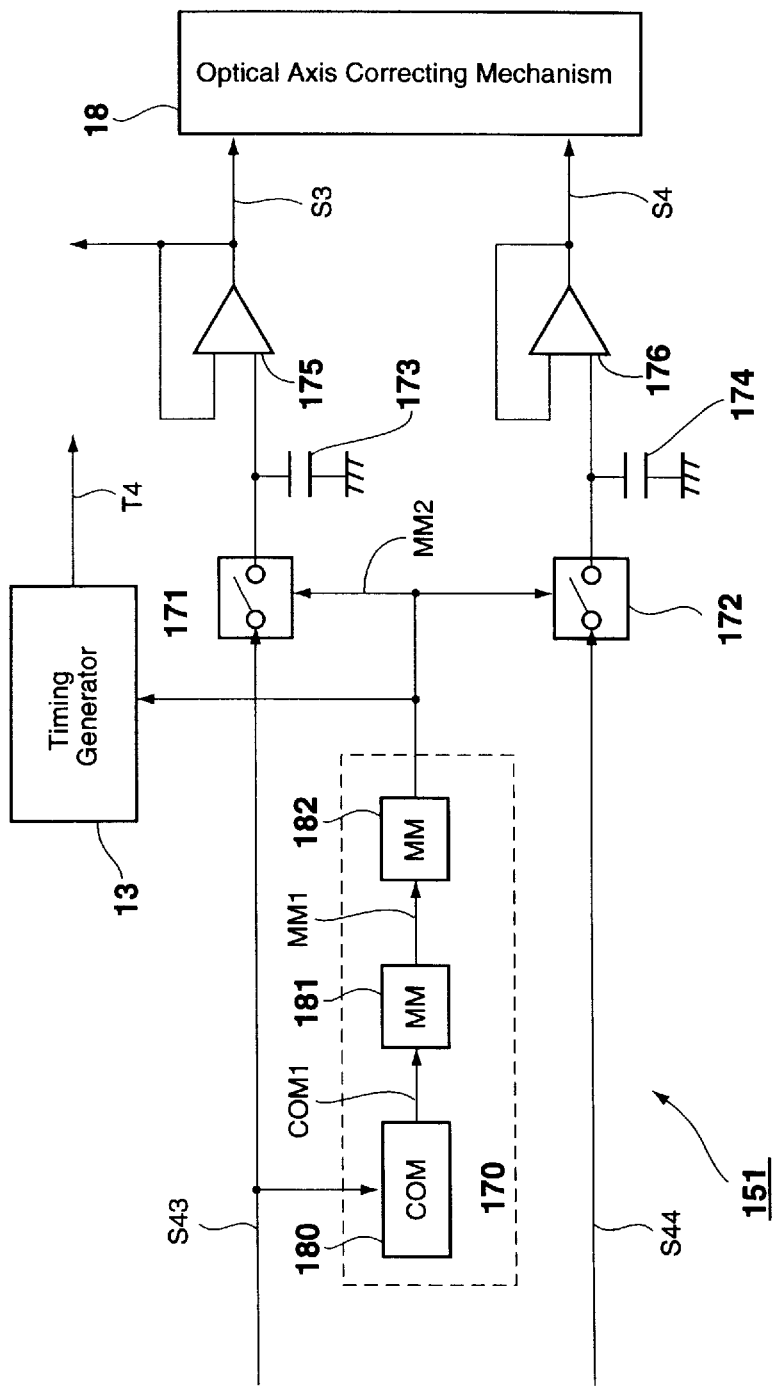
FIG. 22 is a diagram of the film positioning error signal detector of FIG. 17.
Figure 23:
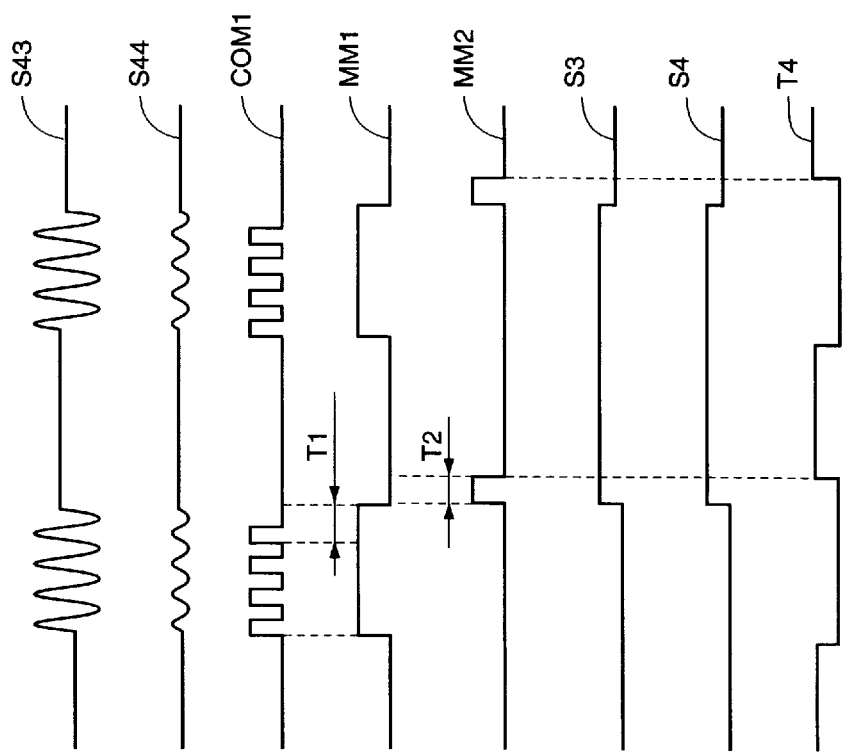
FIG. 23A through FIG. 23H are signal waveforms to which reference will be made in explaining an operation of the film positioning error signal detector of FIG. 22.

The positioning error signal detector 151 (FIG. 17) is illustrated in FIG. 22. As shown therein, the positioning error signal detector 151 receives signals S43 and S44 and holds such signals for sampling in reference to a timing signal MM2 generated in a timing signal generator 170 when a film stop period is started. As a result, positioning error detecting signals S3 and S4 are generated. The operation of the positioning error signal detector operation will now be explained with reference to the signal waveforms shown in FIGS. 23A through 23H.

The positioning error signal detector 151 receives signals S43 and S44 shown in FIGS. 23A and 23B and supplies the same to sample holding condensers 173 and 174 by way of switching circuits 171 and 172 which may be turned on by the timing signal MM2. Terminal voltages of the sample holding condensers 173 and 174 may be outputted as positioning error detecting signals S3 and S4 by way of arithmetic amplifier circuits 175 and 176, each of which has a voltage follower circuit coupled thereto.

In the timing signal generator 170, the output signal S43 is supplied to a comparator (COM)180, wherein the signal S43 is compared with a specified reference to generate a comparing signal COM1 (FIG. 23C) whose signal level may be switched according to the pulse of the output signal S43. The comparing signal COM1 is supplied to a mono-multi-vibrator (MM) 181 which may be formed by a (retriggerable) mono-multi-vibrator. The MM 181 is used to generate a timing signal MM1 (FIG. 23D) whose signal level rises synchronously with the rising of the comparing signal COM1 and falls a certain time T1 after the comparing signal COM1 signal level falls. Consequently, the signal level of the timing signal MM1 falls when the repeating of the output signal S43 ripples stops. The timing signal MM1 is supplied to a mono-multi-vibrator (MM) 182 which is used to generate a timing signal MM2.(FIG. 23E) whose signal level rises only for a fixed time T2 after the timing signal MM1 falls. Switching circuits 171 and 172 are turned on synchronously with the rising of the timing signal MM2. Consequently, the timing signal generator 170 can generate a timing signal MM2 indicating the start of a film stop period from a result of the running of the film 2.

The positioning error signal detector 151 outputs positioning error detecting signals S3 and S4 (FIG. 23F and FIG. 23G) generated by sample-holding the output signals S43 and S44 when the timing signal MM2 rises. Further, the timing generator 13 generates a timing signal T4 (FIG. 23H), in reference to the falling of the timing signal MM2, for instructing the light source and the television camera 19 to start emitting light and photographing. Consequently, each frame of the object movie film 2 can be picked up while the film 2 stops.

Figure 24:
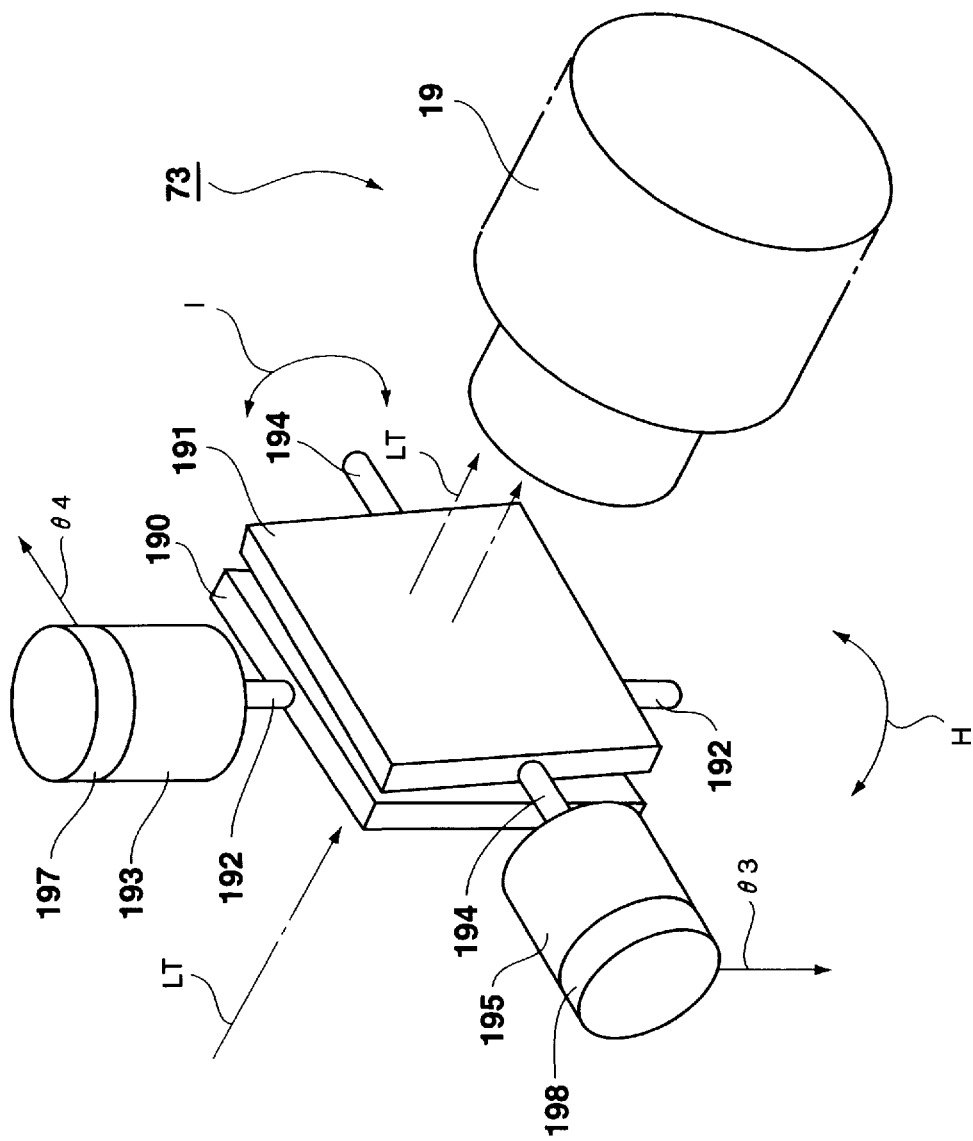
FIG. 24 is a perspective view of an optical axis correcting mechanism which may be used in the apparatus of FIG. 1.

FIG. 24 illustrates the optical system 73 provided in the optical axis correcting mechanism shown in FIG. 1. In this optical axis correcting mechanism 73, inclination of plate glasses 190 and 191 (which may be fabricated from a transparent plate-like material or the like) may be changed so as to change the axis of the transmitted light LT from the film 2. In a standard position, the plate glasses 190 and 191 may be positioned on the path of transmitted light LT such that the input/output light plane becomes substantially orthogonal to the optical axis of the optical system of the television camera 19.

The plate glass 190 of the gate unit 70 includes bars 192 attached to both end faces of the plate glass itself and arranged so as to be parallel to the film running direction. These bars 192 function as an axis for the plate glass 190 to be rotated by a motor 193 in the direction of an arrow H. The plate glass 191 of the television camera 19 includes bar 194 attached to both end faces of the plate glass itself and arranged so as to be vertical to the film running direction. These bars 194 function as an axis for the plate glass 191 to be rotated by a motor 195 in the direction shown by an arrow I. Each of the motors 193 and 195 is provided with an angle sensor 197/198. Such angle sensors are adapted to output inclination signals Θ4 and Θ3, each indicating an inclination from the reference position.

Consequently, the light optical correcting mechanism 18 can incline the plate glasses 190 and 191 by driving the motors 193 and 195 so that the axis of transmitted light LT can be changed from their reference positions according to the inclination of the plate glasses 190 and 191. Thus, the object image position to be picked up by the television camera 19 can be changed.

Figure 25:
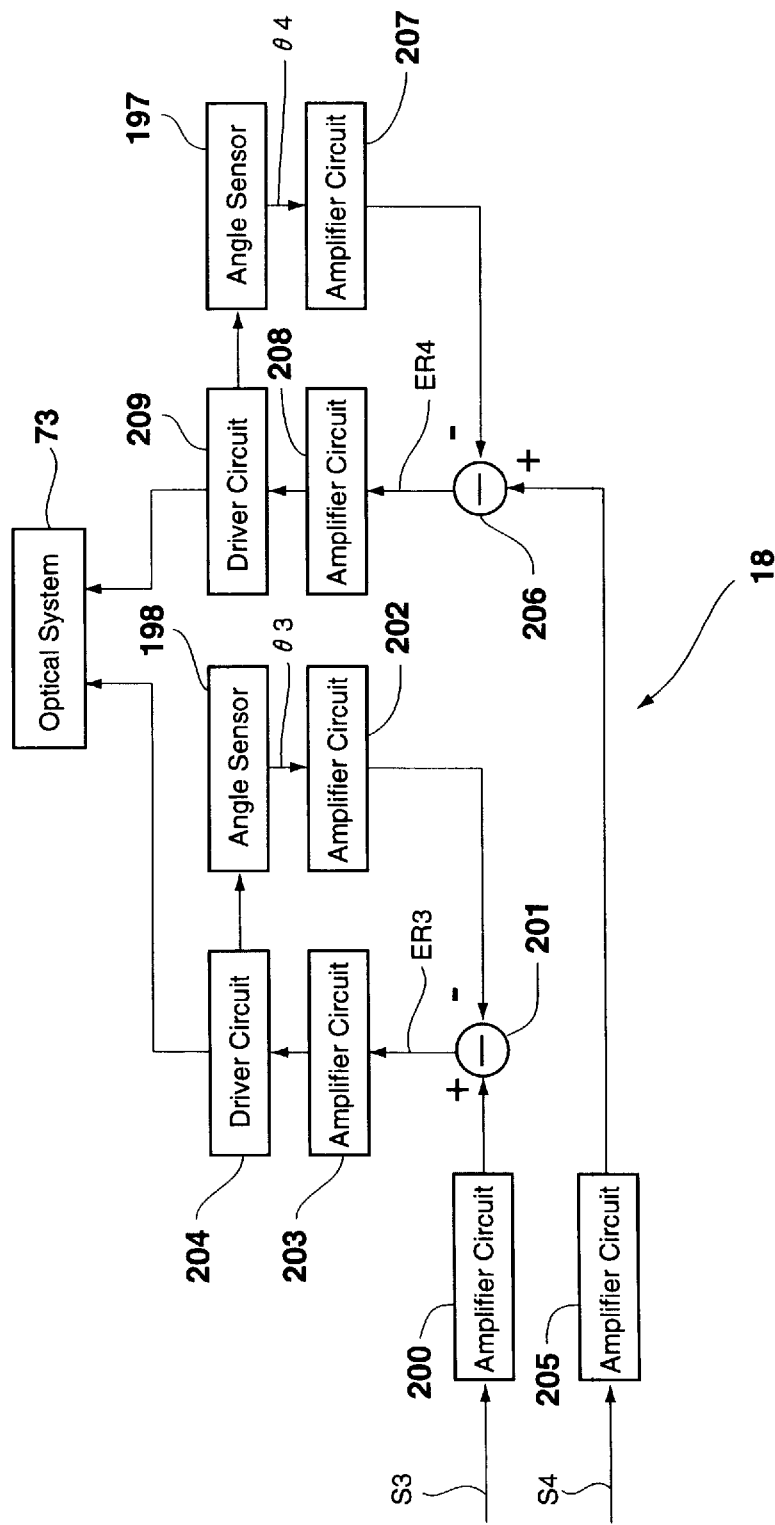
FIG. 25 is a diagram of the optical axis correcting mechanism of FIG. 1.

The optical axis correcting mechanism 18 is illustrated in FIG. 25. Basically, the optical axis correcting mechanism 18 forms a servo loop and corrects the axis of transmitted light L corresponding to the positioning error detection signals S3 and S4.

The optical axis correcting mechanism 18 receives the positioning error detection signal S3 and supplies the same to an amplifier circuit 200 so as to be amplified with a fixed gain. The amplified signal from the amplifier circuit 200 and the inclination signal Θ3 from an amplifier circuit 202 are supplied to a subtractor 201, wherein the inclination signal Θ3 is subtracted from the positioning error detection signal S3 so as to generate an error signal ER3. Such error signal ER3 is amplified by an amplifier circuit 203 and supplied to a driver circuit 204 of the motor 195. Consequently, the optical axis correcting mechanism 18 inclines the plate glass 191 to correct the picture shift in the direction parallel to film running so that the error signal ER3 goes to zero.

The optical axis correcting mechanism 18 also receives the positioning error detection signal S4 and supplies the same to an amplifier circuit 205 so as to be amplified with a fixed gain. The amplified signal from the amplifier circuit 205 and the inclination signal Θ4 from an amplifier circuit 207 are supplied to a subtractor 206, wherein the inclination signal Θ4 is subtracted from the positioning error detecting signal S4 so as to generate an error signal ER4. Such error signal ER4 is amplified by an amplifier circuit 208 and supplied to a driver circuit 209 of a motor 193. Consequently, the optical axis correcting mechanism 18 inclines the plate glass 190 to correct the picture shift in the direction parallel to film running so that the error signal ER4 goes to zero.

In operation, and as shown in FIG. 3, the movie film 2 held on the supply reel 7 and the take-up reel 8, pressed by the guide rollers 27 and 35 by tension arms 26 and 34 according to the feeding direction of the film 2, is led at a constant rate to the intermittent film feeder 21 by the film feeding sprocket 29 or 37 whose teeth are smaller than the perforations 3 (FIG. 2). In the intermittent film feeder 21, the film 2, engaged by one side of the intermittent film feeding sprocket 50 whose teeth are smaller than the perforations 3 after passing a cushion section between continuous and intermittent film feeding actions, is led intermittently to a loop-like film path formed by guide rollers 44 to 47. Then, the film 2, engaged with the other side of the intermittent film feeding sprocket 50, is led out of the film path and fed to the continuous film feeding side via a cushion section similar to that mentioned above. Consequently, the film 2 is fed intermittently by the sprocket 50 at the bottom of the loop-like film path, so as to avoid damages often caused by intermittent feeding of the film 2 carried out by using registration pins. Furthermore, this arrangement may facilitate maintenance and inspection of the telecine apparatus.

The film is fed in the loop-like film path which is formed symmetrically on the supply side and on the take-up side in relation to the gate unit 70. The guide rollers 44 and 47 (FIG. 5) arranged on the intermittent film feeding sprocket 50 side are switched over to fixed rollers by the magnetic brakes 93 and 95 according to the film feeding direction, so that pressure is applied in the film feeding direction before the gate unit 70. Consequently, the film 2 can be fed under the same conditions whether the film 2 travels to the take-up side or to the supply side. Furthermore, the film 2 is guided by the guide rollers 44 to 47 which contact with the base side of the film in the loop-like film path. Thus, the emulsion of the film can be protected effectively from damages.

The film 2 is lighted intermittently by the light source 15 from inside the loop-like path of the film 2 synchronously with the intermittent film feeding action. The transmitted light from the film 2 is received by the television camera 19 which is arranged outside the loop-like path of the film 2. Thus, the telecine apparatus 1 can photograph the film 2 with the television camera 19 on the emulsion side. Furthermore, if the film 2 is shifted from a specified reference stop position lighted by the light source 15, a positioning error is detected by the positioning error detecting mechanism 17 (FIG. 1). In accordance with such detection, the optical axis correcting mechanism 18 (FIG. 1) corrects the axis of transmitted light so as to compensate for the picture shift. As a result, the telecine apparatus 1 can provide relatively high quality video signals S1 (FIG. 1).

In this intermittent film feeding and film processing, guide rollers 44 and 47 (FIG. 5) arranged on the intermittent film feeding sprocket side are pressed or moved by springs 92 and 94 in the direction which enlarges the loop-like film path formed by the guide rollers 44 to 47. The control arms 90 and 91 are held by air dampers 96 and 97 so as to protect the film from abrupt position changes in direction in contraction of the loop-like film path. Therefore, the film 2, guided by the guide rollers 44 or 47 held at a fixed position by magnetic brakes 93 or 95, is protected from abrupt tension changes which may occur during frame by frame film feeding. When the film 2 stops, the guide roller 44 or 47 is pressed in the direction which enlarges the loop-like film path. Thus, the film 2 can be guided by the guide rollers 44 and 47 which are held in such a manner so as not to be affected by abrupt film tension changes which may occur during intermittent film feeding. When the film 2 expands and contracts due to a change in time, temperature, humidity, and so forth, the guide roller 44 or 47 changes its position to absorb the expansion and contraction of the film 2 so that the film 2 can be fed intermittently just like in normal film running. The intermittent film feeding sprocket 50 having relatively small teeth is also effective in avoiding or reducing backlash caused by the pressure of the guide rollers 44 and 47 so as to assure proper intermittent feeding of the film 2. Therefore, even when the film 2 expands and contracts, positioning accuracy of the film 2 can be effectively maintained.

As shown in FIG. 9, a correction data generator 105 is used to generate film feeding distance correction data D5 according to the number of pulses from the stepping motor 58 from the film feeding direction positioning error detection signal S3 detected by the positioning error detecting mechanism 17. This correction data D5 is used to correct the feeding distance data D1 held in a register 101A, and consequently, the frame feeding is corrected according to the result of the positioning error detected in the feeding of the previous film frame. Thus, the previous frame feeding result updates the subsequent frame feeding so that each frame 4 (FIG. 2) stop position is closer to a reference stop position in a continuous frame feeding action. Thus, the feeding of the film 2 is corrected sequentially. Consequently, when the film 2 expands and contracts and shifts from a reference stop position, accumulated positioning errors are eliminated to improve the positioning accuracy of the film 2. Even when the film 2 does not expand and contract, uneven frame feeding is avoided, thereby improving the positioning accuracy of the film 2.

In the gate unit 70 shown in FIG. 10, the positioning error detection technique of FIG. 9 is used. In implementing such technique, a plurality of condensers C1A to C2B (FIG. 17) and a plurality of electrodes H1A to H2D arranged on the guide shoe 110 corresponding to the direction and width of the film running and an electrode member 134 of the movable side picture gate 72 which faces the guide shoe 110 across the film 2 and arranged as previously described. Positioning errors are detected by detecting the capacitance changes of the condensers C1A to C2B caused by film position changes. In other words, positioning errors are detected by detecting the signal level at each film stop position using displacement signals S13 and S23 generated from output voltages S11, S12 and S21 and S22 from the voltage divider formed with the condensers C1A to C2B and resistors R1 to R4. The signal levels of the displacement signals S13 and S23 change in correspondence to changes in film position. Thus, the present invention provides a telecine apparatus 1 having a relatively simple configuration which can detect positioning errors at high accuracy and compensate for the picture shift so as to output high quality video signals S1.

Electrodes 121 (FIG. 11A) used for detecting positioning errors may be formed by arranging a conductor ceramic material on an insulating ceramic material. Since these ceramic materials are wear-resistant, they effectively avoid deterioration of positioning error detection accuracy which may be caused by wear of the electrodes 121. Further, since the surfaces of these electrodes 121 are polished, the film 2 can be fed smoothly. Such polishing is also effective in avoiding or reducing wear of the electrodes 121. Furthermore, notches 125 corresponding to a number of perforations 3 assigned to each frame of the film 2 are formed in the electrode assemblies instead of additional electrodes. The perforations 3 are lighted from the light source 15 through the notches 125 while the film 2 stops. When the perforations 3 are seen as if they stopped, it can be judged that the film 2 is fed intermittently and correctly. Thus, the picture shift of the film 2 can be easily checked.

In the gate unit 70 (FIG. 10) in which the electrodes 121 are arranged, a film holder 130, pressed by the spring(s) 132 against the guide shoe 110 and held on the base 131, is arranged on each side of the guide shoe 110 in the direction of film feeding. When running on the guide shoe 110, the film 2 is thus pressed by the film holders 130 against the guide shoe 110. Consequently, when the film 2 runs on the electrodes 121, the film 2 is prevented from deviating from the reference positions in the width direction, thereby effectively avoiding deterioration of the positioning error detecting accuracy. The joints of the film 2 and foreign material which may be stuck on the film which may cause the film to be damaged are absorbed by the springs 132 while the film 2 is pressed against both the guide shoe 110 and the film holders which move up/down. This enables the film 2 to smoothly pass the film holders 130.

Furthermore, in the gate unit 70, the electrode facing the electrode 121 is the electrode member 134. This electrode member is pressed by the spring(s) 135 toward or against the electrode 121 while the projection 136 limits the positional change or movement of the electrode member 134 toward the electrode 121. Consequently, at a joint or junction of the film 2, the spring(s) 132 contract to cause the electrode 134 to change its position so that the film can be effectively protected from damages. Furthermore, even when the film holder 130 changes its position due to a foreign matter, deformed perforation, and so forth, the electrode member 134 is held at a fixed interval from the electrode 121 of the guide shoe 110, thus allowing electrostatic changes of the electrode caused by foreign matters and so forth to be effectively avoided and allowing film positioning errors to be detected at a relatively high accuracy.

The result of detection made according to the capacitance formed between the electrodes facing each other across the film 2 changes depending on the dielectric constant, thickness, and so forth of the film (which may become a factor in changing capacitance). Thus, signals S14 and S24 output from the differential signal generator 139 (FIG. 17) which indicate an elapsed time of a film positioning error are output without being processed in the subtractors 155 and 156 in the material quality corrector 150 (FIGS. 17 and 18) after the running period signal is amplified with a fixed gain by the variable gain amplifier circuits 153 and 154. Then, the amplitude and DC level of the signals S14 and S24 in this period are detected or obtained in the correction signal generator 157. The subsequent stop period output signals S14 and S24 are amplified with a gain in the variable gain amplifier circuits 153 and 154 such that the running period amplitude becomes the specified value, then the running period DC level of these signals S14 and S24 are amplified in the subsequent subtractors 155 and 156 so that the level becomes 0 before they are output. Consequently, deterioration of film positioning error detection accuracy by material quality, and so forth can be effectively avoided.

At this time, correction signals S5 and S6 are generated from the output signal S14, and positive and negative peak detection results corresponding to 4-time ripples during a film running period are averaged by the low-pass filters 161 and 162. Consequently, deterioration of positioning error detecting accuracy can be effectively prevented.

The output signals S43 and S44 (FIG. 23) whose gains and DC levels are corrected as described above are held and sampled by use of the switching circuits 171 and 172, sample holding condensers 173 and 174, and arithmetic amplifier circuits 175 and 176 in the positioning error signal detector 151 (FIG. 22) when a film stop period is started. As a result, positioning error detection signals S3 and S4 used in the film feeding direction and in the film width direction are generated. At this time, the output signal S14 is converted to a dual-value signal synchronized with film ripples in the timing signal generator 170, and this dual value signal is used to detect the start timing of a film stop period. According to this detected timing, the output signals S43 and S44 are held for sampling to generate positioning error detection signals S3 and S4. Consequently, the film stop status can be detected without providing any special means for detecting such film stop status and used to generate positioning error detection signals S3 and S4. The detected positioning error detection signals S3 and S4 are supplied to a servo loop (which includes the angle sensor 198, amplifier circuits 202 and 203., the driver 204, the angle sensor 197, amplifier circuits 207 and 208, and the driver 209) for controlling the inclinations of the glass plates 190 and 191 arranged in the path of transmitted light from the film 2 as a control target. Thus, the axis of transmitted light is corrected to correct positioning errors and enable properly processed video signals S1 to be outputted from the television camera 19.

Therefore, according to the present apparatus, the film 2 may be held in a loop-like film path and fed intermittently by the intermittent film feeding sprocket arranged at the bottom of the film loop-like path. The film 2 is then lighted from inside the loop-like film path, while the picture shift is compensated. As a result, maintenance and inspection for the telecine apparatus 1 may be easily performed, and damages to the film 2 can be effectively avoided so as to allow high quality video signals S1 to be provided.

In the intermittent film feeder, guide rollers are held or arranged-in such a manner that their positions can be changed by the use of springs to enable the film 2 to be pressed or moved by these guide rollers. Abrupt displacement of these guide rollers are absorbed by air dampers so that the film 2 can be fed smoothly without being affected by abrupt changes in film tension which may occur during intermittent film feeding while the film is kept taut or in tension. Furthermore, expansion and contraction of the film 2 can also be absorbed. Thus, deterioration of film positioning accuracy can be effectively prevented even when the film expands and contracts. Additionally, noise due to film feeding from the sprockets may be reduced. Thus, the above present apparatus provides these advantages and features in a relatively simple configuration.

In the above embodiment, each of the glass plates made of a transparent plate-like material is inclined to correct the axis of transmitted light. However, a lens system may be inclined partly or as a whole to correct the axis of transmitted light. Further, the transparent plate-like members may be thinned and sealed between the members themselves such that a liquid having a specified refractivity is charged between the transparent plate-like members to correct the axis of transmitted light.

Figure 26:
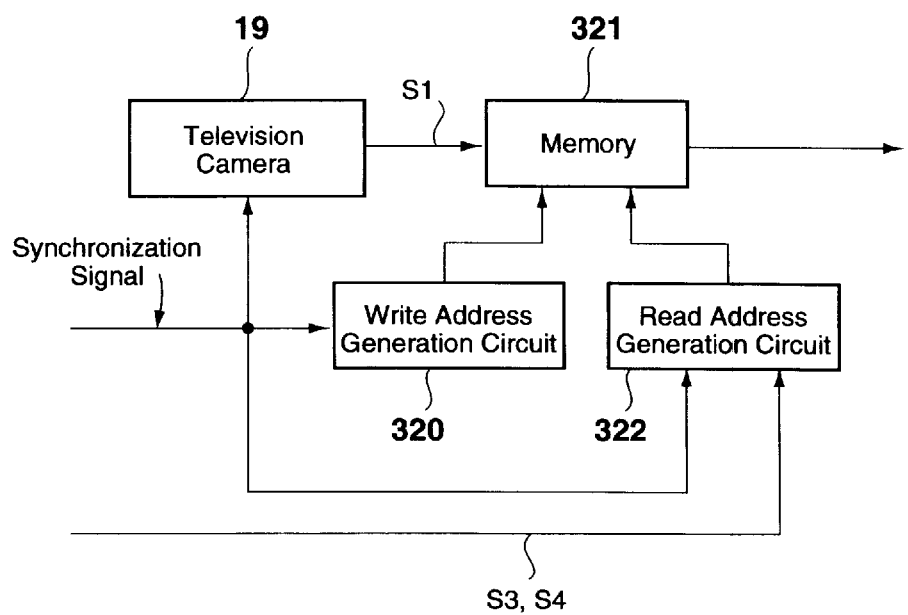
FIG. 26 is a diagram of an optical axis correcting mechanism.

In the above embodiment, the axis of transmitted light is corrected to avoid film positioning errors, but the present invention is not so limited and various other methods may also be adopted for avoiding such film positioning errors. For example, the picture shift may be corrected by processing video signals supplied from the television camera 19 as shown in FIG. 26. That is, write addresses may be generated in a write address generation circuit 320 synchronously with the television camera 19 and these write addresses used to sequentially and cyclically save video signals S1 in a memory 321. Then, read addresses may be generated in a read address generation circuit 322 synchronously with the write address generation circuit 320 and these read addresses used to sequentially and cyclically read the video signals SI from the memory 321. At this time, the read address generation circuit 322 shifts read address values according to the positioning error detection signals S3 and S4 so as to generate read addresses which may correct for positioning errors by reading images from the memory 321 according to the shifted address values. Otherwise, the driving condition of CCD solid image sensors in the television camera 19 may be changed to correct positioning errors together with the conversion of images formed on each image sensor surface to video signals.

Furthermore, in the above embodiment, a plurality of condensers are formed on both sides of an object movie film, and film positioning errors are detected according to the capacitance changes between these condensers. However, the present invention is not so limited and can also utilize other various methods for detecting film positioning errors such as, for example, a method of combining photosensors and light receiving elements to detect film positioning errors, a method of arranging line sensors to detect film positioning errors, a method of processing picked up perforation images to detect film positioning errors, and so forth.

Furthermore, in the above embodiment, a voltage divider is formed with electrodes facing each other and resistors, and the divided voltage from this voltage divider is used for detecting film positioning errors. However, other various methods may also be utilized for detecting film positioning errors by processing detection signals whose levels change according to the capacitance obtained by various detecting methods. Such other methods may include a method of using other condensers instead of resistors for forming a voltage divider, a method of using coils together with condensers to detect film positioning errors according to changes of resonant frequency, and so forth.

In the above embodiment, each movie film stop is detected to generate a positioning error detection signal and timings of the television camera 19 and the light source 15 are controlled for detecting film positioning errors. However, each detected film stop may also be used for control of various timings. For example, it can be used for the timing signal of the material quality corrector.

Further, in the above embodiment, each movie film stop is detected in reference to a ripple of the detection signal. However, the present invention also allows an actual film running to be detected and used for various objects.

Further, in the above embodiment, the film feeding path is formed symmetrically in the gate unit so that it has the same shape both on the supply side and on the take-up side. However, the present invention is not so limited and can also apply other various methods or arrangements which form the film feeding path asymmetrically.

Furthermore, in the above embodiment, the movie film is fed intermittently to both the take-up side and supply side. However, the film may be fed intermittently only from the supply side to the take-up side or from the take-up side to the supply side.

Furthermore, in the above embodiment, the film feeding path is formed so as to have an approximate rectangular shape by four guide rollers. However, the present invention is not so limited and any number of guide rollers and other shapes of the film feeding path may be utilized.

In the above embodiment, the movie film 2 is fed intermittently by an intermittent film feeding sprocket along a loop-like film path. Alternatively, the present invention can also use methods for forming the film feeding path and for arranging the above sprocket on both the supply side and on the take-up side for feeding the film intermittently.

Furthermore, in the above description, the present invention was described as being applied to a telecine apparatus. However, the present invention can also be applied to a movie projector, an electronic light exposure apparatus, and so forth. When this invention is applied to a cinema projector, an optical system for projecting transmitted light of a movie film may be used as an optical processing device. When this invention is applied to an electronic exposure apparatus, an electronic beam projecting system for projecting an electronic beam to a movie film before exposure may be used as an optical processing device of the film 2.

Furthermore, in the above description, optical processing of a movie film was described, this invention is not so limited and can also be applied to various types of film processing apparatuses for processing films which have perforations.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A film processing apparatus for intermittently feeding a movie film on a frame by frame basis to a film processing unit for processing thereat by inserting projections into openings formed on both sides of said movie film at predetermined pitches and driving the same by use of a driving device, said film processing apparatus comprising:

guiding means for guiding said film along a path which passes nearby said film processing unit so as to enable said film processing unit to perform said processing;

means for exerting pressure on said film by moving said guiding means so that a portion of said film which passes nearby said film processing unit is held in tension;

restraining means for restraining said guiding means from moving while said film is being fed; and pressure detecting means for detecting the pressure exerted on said film.

2. A film processing apparatus as in claim 1, wherein said restraining means includes a magnetic brake.

3. A film processing apparatus as in claim 1, wherein said restraining means includes a damper.

4. A film processing apparatus as in claim 1, wherein said pressure detecting means includes a load cell.

5. A film processing apparatus as in claim 1, wherein the exerting means moves said guiding means in accordance with the pressure detected by said pressure detecting means.

6. A film processing apparatus as in claim 5, wherein said restraining means restrains said guiding means from movement while said film is being fed and enables said guiding means to be moved when said film stops.

7. A film processing apparatus as in claim 1, wherein said path includes two non-tension portions wherein said film is substantially not in tension and a portion between said non-tension portions wherein said film passes nearby said film processing unit under tension.

8. A film processing apparatus as in claim 1, wherein said path includes a loop portion in which said film processing unit is located at an intermediate point thereof.

9. A film processing apparatus as in claim 8, wherein said film has a base side and an emulsion side and wherein said guiding means contacts said base side of said film while guiding said film in said loop portion.

10. A film processing apparatus as in claim 1, wherein said path is formed symmetrically around said film processing unit.

11. A film processing apparatus as in claim 1, wherein said driving device includes a motor-driven sprocket having teeth which are smaller than said openings of said film.

12. A film processing apparatus for intermittently feeding a movie film on a frame by frame basis to a film processing unit for processing thereat by inserting projections into openings formed on both sides of said movie film at predetermined pitches and driving the same by use of a driving device, said film processing apparatus comprising:

guiding means for guiding said film along a path which passes nearby said film processing unit so as to enable said film processing unit to perform said processing;

means for exerting pressure on said film by moving said guiding means so that a portion of said film which passes nearby said film processing unit is held in tension;

restraining means for restraining said guiding means from moving while said film is being fed; and position detecting means for detecting the position of said film and for generating a position detection signal therefrom usable by said driving device for driving said film.

13. A film processing apparatus as in claim 12, wherein said position detecting means includes a first electrode and a second electrode which are arranged so as to face each other across said film.

14. A film processing apparatus as in claim 13, wherein said position detecting means detects the position of said film in accordance with capacitance level changes between said first and second electrodes.

15. A film processing apparatus as in claim 13, wherein said first electrode includes a pair of electrodes having approximately the same shape and arranged near positions where said openings stop when said film is fed intermittently frame by frame.

16. A film processing apparatus as in claim 15, wherein the first and second electrodes include a plurality of said pairs of electrodes symmetrically arranged at corresponding positions on both sides of said film with respect to a feeding direction of said film.

17. A film processing apparatus as in claim 14, further comprising signal correcting means for correcting a signal level of said detection signal while said film is stopping by use of a reference signal level obtained from an amplitude of said detection signal produced while said film is running.

18. A film processing apparatus as in claim 17, wherein said reference signal level is determined from an averaged value of a plurality of positive and negative peak values of said detection signal obtained while said film is running.

19. A film processing apparatus as in claim 14, further comprising position error signal detecting means for determining a position error signal from said detection signal which indicates a displacement of said film from a reference position when said film is stopped nearby said film processing unit.

20. A film processing apparatus as in claim 19, further comprising feeding length correcting means for correcting a feed length of said film in accordance with said positioning error signal.

21. A film processing apparatus as in claim 19, further comprising a light source for illuminating said film in said film processing unit, a light receiving plane for receiving a light transmitted through said film processing unit after illuminating said film, and optical axis correcting means for correcting an optical axis of said light receiving plane according to said positioning error signal.

22. A film processing apparatus as in claim 19, wherein said positioning error signal detecting means obtains a timing signal from said detection signal which indicates that said film is stopped.

23. A film processing apparatus as in claim 14, further comprising signal level correcting means for correcting a signal level of said detection signal while said film is stopping by reference to a signal level of said detection signal obtained while said film is running.

24. A film processing apparatus as in claim 13, wherein said first electrode is arranged on a first base and said second electrode is arranged on a second base, and wherein said second base includes a pressing mechanism for pressing said film against said first base and being movable in a direction corresponding to the thickness direction of said film.

25. A film processing apparatus as in claim 24, wherein said second electrode is arranged so as to have a uniform gap between said film and to be movable in the thickness direction of said film.

26. A film processing apparatus as in claim 24, wherein said first base has a cutout at a location corresponding to one of said openings.

* * * * *